(12) United States Patent
Shim et al.

(10) Patent No.: US 7,103,491 B2
(45) Date of Patent: Sep. 5, 2006

(54) METHOD OF ESTIMATING PARAMETERS OF TIME SERIES DATA USING FOURIER TRANSFORM

(76) Inventors: Kwan Shik Shim, 106-902 Line APT., 996-3 Munheung-dong, Buk-gu, Gwangju Metropolitan City, 500-110 (KR); Hae Kon Nam, 105-702 Hyundai APT., Yeonje-dong, Buk-gu, Gwangju Metropolitan City, 500-190 (KR)

( * ) Notice: Subject to any disclaimer, the term of this patent is extended or adjusted under 35 U.S.C. 154(b) by 0 days.

(21) Appl. No.: 11/000,225

(22) Filed: Dec. 1, 2004

(65) Prior Publication Data
US 2006/0047452 A1    Mar. 2, 2006

(30) Foreign Application Priority Data
Aug. 31, 2004   (KR)   ................. 10-2004-0069036

(51) Int. Cl.
*G01R 23/16*    (2006.01)
*G06F 19/00*    (2006.01)
(52) U.S. Cl. ..................................... 702/77; 324/76.21

(58) Field of Classification Search ............... 702/77
See application file for complete search history.

(56) References Cited

U.S. PATENT DOCUMENTS
6,104,984 A  *  8/2000  Thorpe et al. ................ 702/75

OTHER PUBLICATIONS

"Signal Processing & Linear Systems". B.P. Lathi. Oxford University Press Inc., New York, NY. Copyright 1998. pp. 44-45,54-55,634-635,638-640.*

* cited by examiner

*Primary Examiner*—John Barlow
*Assistant Examiner*—Jonathan Moffat
(74) *Attorney, Agent, or Firm*—Dickstein Shapiro LLP

(57) ABSTRACT

A method of estimating parameters of time series data using a Fourier transform is disclosed. The parameter estimation method of the present invention can directly estimate modes and parameters, indicating the characteristics of a dynamic system, on the basis of the Fourier transform of the time series data. Accordingly, the present invention is advantageous in that it can estimate parameters of the system through a single Fourier transform without repeatedly calculating a Fourier transform, thus shortening the time required to estimate the parameters.

15 Claims, 24 Drawing Sheets

FIG.4

| | EXPONENTIALLY DAMPED SINE FUNCTION |
|---|---|
| MAGNITUDE | $\|X(\omega)\| = \dfrac{A\omega_1}{\sqrt{(\alpha^2 + \omega_1^2 - \omega^2)^2 + (2\alpha\omega)^2}}$ |
| PHASE | $\phi(\omega) = -\arctan \dfrac{2\alpha\omega}{\alpha^2 + \omega_1^2 - \omega^2}$ |

FIG.6

| | EXPONENTIALLY DAMPED COSINE FUNCTION |
|---|---|
| MAGNITUDE | $\|X(\omega)\| = \dfrac{A\sqrt{\alpha^2+\omega^2}}{\sqrt{(\alpha^2+\omega_1^2-\omega^2)^2+(2\alpha\omega)^2}}$ |
| PHASE | $\phi(\omega) = \arctan\left(\dfrac{\omega}{\alpha}\right) - \arctan\left(\dfrac{2\alpha\omega}{\alpha^2+\omega_1^2-\omega^2}\right)$ |

METHOD OF ESTIMATING PARAMETERS OF TIME SERIES DATA USING FOURIER TRANSFORM

BACKGROUND OF THE INVENTION

1. Field of the Invention

The present invention relates, in general, to a method of estimating the parameters of time series data using a Fourier transform and, more particularly, to a method of estimating the parameters of time series data using a Fourier transform, which can shorten the time required for calculation.

2. Description of the Related Art

Generally, mode (eigenvalue) analysis using eigenanalysis is widely applied to the analysis of a dynamic system. However, since eigenanalysis cannot be directly applied to time series data, only frequency analysis is restrictively applied to time series data.

For a method of estimating a mode in time series data, a Prony method has been generally used. However, this method calculates a complex exponential function on the basis of a linear prediction matrix obtained by converting signals into an autoregressive moving average (ARMA) model.

A Prony method is problematic in that, since a linear prediction equation must be solved and the solution of a higher order equation must be calculated when signals are fitted to a complex exponential function, the time required for calculation increases. This method entails noise error, and a mode sensitively varies with an interval between signal data and the intensity of the data.

Recently, Fourier transforms have been broadly applied to various industrial fields. Especially, with the development of a fast Fourier transform (FFT), Fourier transforms have been used to detect and analyze the frequency of a given signal using a computer.

Fast Fourier transforms have been mainly used to precisely and rapidly obtain the frequency of a given signal. In a dynamic system, a real part of a mode used to learn damping characteristics is a more important factor than the frequency of the mode.

For a technique of estimating a real part using a Fourier transform, only a sliding window method of FIG. 1 of repeatedly calculating the attenuation level of the magnitude of a Fourier spectrum to estimate a mode has been developed.

In FIG. 1, a signal x(t) is Fourier transformed over equal time intervals (a), (b) and (c) to calculate respective spectrums. The sliding window method is a method of estimating the real part of a mode by fitting the peak values of the spectrums to an exponentially damped function.

However, the conventional method is problematic in that a Fourier transform must be repeatedly calculated depending on a computer simulation, thus increasing the time required for calculation.

SUMMARY OF THE INVENTION

Accordingly, the present invention has been made keeping in mind the above problems occurring in the prior art, and an object of the present invention is to provide a method of estimating the parameters of time series data using a Fourier transform, which can shorten the time required for calculation.

In accordance with a first embodiment of the present invention, there is provided a method of estimating parameters of time series data using a Fourier transform, comprising the steps of inputting time series data, performing a Fourier transform with respect to the input time series data to calculate a Fourier spectrum, obtaining a real part of a mode by subtracting a frequency of the Fourier spectrum corresponding to $1/\sqrt{2}$ of a magnitude of the calculated Fourier spectrum from a peak frequency, and estimating parameters of the time series data on the basis of the obtained Fourier spectrum and the real part of the mode, and outputting estimation results.

In accordance with a second embodiment of the present invention, there is provided a method of estimating parameters of time series data using a Fourier transform, comprising the steps of inputting time series data, performing a Fourier transform with respect to the input time series data to calculate a Fourier spectrum, and calculating a power spectrum on the basis of the Fourier spectrum, obtaining a real part of a mode by subtracting a frequency of the power spectrum corresponding to ½ of a magnitude of the calculated power spectrum from a peak frequency, and estimating parameters of the time series data on the basis of the obtained power spectrum and the real part of the mode, and outputting estimation results.

In accordance with a third embodiment of the present invention, there is provided a method of estimating parameters of time series data using a Fourier transform, comprising the steps of inputting time series data, performing a Fourier transform with respect to the input time series data to calculate a Fourier spectrum, obtaining a real part of a first mode by subtracting a frequency of the Fourier spectrum corresponding to $1/\sqrt{2}$ of a magnitude of the calculated Fourier spectrum from a peak frequency, calculating a power spectrum on the basis of the Fourier spectrum, obtaining a real part of a second mode by subtracting a frequency of the power spectrum corresponding to ½ of a magnitude of the calculated power spectrum from a peak frequency, selecting a real part of a mode having a relatively low value from the real parts of the first and second modes and selecting a spectrum used to obtain the real part of the selected mode from the calculated Fourier spectrum and power spectrum, and estimating parameters of the time series data on the basis of the real part of the selected mode and the selected spectrum and outputting estimation results.

In accordance with a fourth embodiment of the present invention, there is provided a method of estimating parameters of time series data using a Fourier transform, comprising the steps of inputting time series data, performing a Fourier transform with respect to the input time series data to calculate a Fourier spectrum, obtaining a ratio of a magnitude of a Fourier spectrum corresponding to a second arbitrary frequency within a preset range around a peak frequency to a magnitude of a Fourier spectrum corresponding to a first arbitrary frequency within the preset range around the peak frequency, applying the ratio of the magnitudes of the Fourier spectrum to both the Fourier spectrum corresponding to the first arbitrary frequency and the Fourier spectrum corresponding to the second arbitrary frequency, obtaining a quadratic equation and obtaining a solution of the quadratic equation, thus obtaining a real part of a mode, and estimating parameters of the time series data on the basis of the obtained Fourier spectrum and the real part of the obtained mode and outputting estimation results.

In accordance with a fifth embodiment of the present invention, there is provided a method of estimating parameters of time series data using a Fourier transform, comprising the steps of inputting time series data, performing a Fourier transform with respect to the input time series data to calculate a Fourier spectrum, obtaining a power spectrum on the basis of the Fourier spectrum, obtaining a ratio of a magnitude of a power spectrum corresponding to a second arbitrary frequency within a preset range around a peak frequency to a magnitude of a power spectrum corresponding to a first arbitrary frequency within the preset range around the peak frequency, applying the ratio of the magnitudes of the power spectrums to both the power spectrum corresponding to the first arbitrary frequency and the power spectrum corresponding to the second arbitrary frequency, obtaining a quadratic equation, and obtaining a solution of the quadratic equation, thus obtaining a real part of a mode, and estimating parameters of the time series data on the basis of the obtained power spectrum and the real part of the obtained mode, and outputting estimation results.

In addition, the present invention comprises a sixth embodiment as an additional embodiment to the first to fifth embodiments, which comprises the steps of inputting time series data, performing a Fourier transform with respect to the input time series data over a first time interval of a peak frequency and a second time interval delayed from the first time interval by a preset time, respectively, to calculate power spectrums, comparing a sum of k power spectrums over the first time interval with a sum of k power spectrums over the second time interval, determining that the system is stable if the sum of the power spectrums over the first time interval is higher than the sum of the power spectrums over the second time interval, and outputting the determination results.

In addition, the present invention comprises a seventh embodiment as an additional embodiment to the first to fifth embodiments, which comprises the steps of inputting time series data, performing a Fourier transform with respect to the input time series data over a first time interval of a peak frequency and a second time interval delayed from the first time interval by a preset time, respectively, to calculate power spectrums, comparing a peak value in the first time interval with a peak value in the second time interval, determining that the system is stable if the peak value in the first time interval is higher than the peak value in the second time interval and outputting the determination results.

BRIEF DESCRIPTION OF THE DRAWINGS

FIG. 4 is a view showing the magnitude and phase of an exponentially damped sine function;

FIG. 6 is a view showing the magnitude and phase of an exponentially damped cosine function;

DESCRIPTION OF THE PREFERRED EMBODIMENTS

Figure 1:
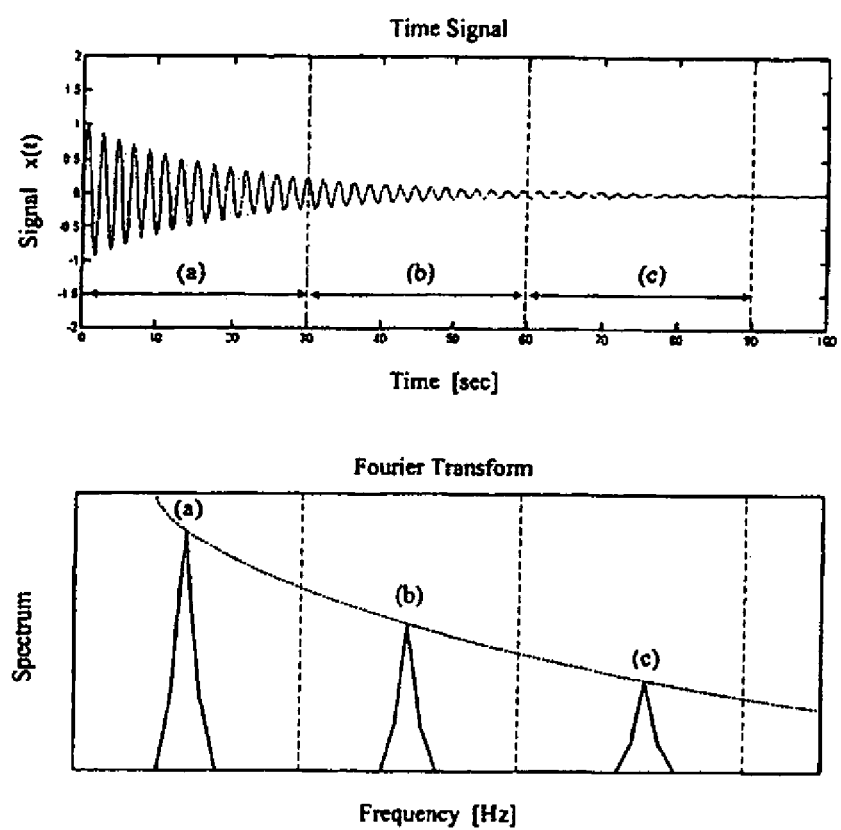
FIG. 1 is a waveform diagram showing a conventional sliding window method.

Hereinafter, embodiments of the present invention will be described in detail with reference to the attached drawings. Reference now should be made to the drawings, in which the same reference numerals are used throughout the different drawings to designate the same or similar components.

[Hardware for Performing the Present Invention]

Figure 2:
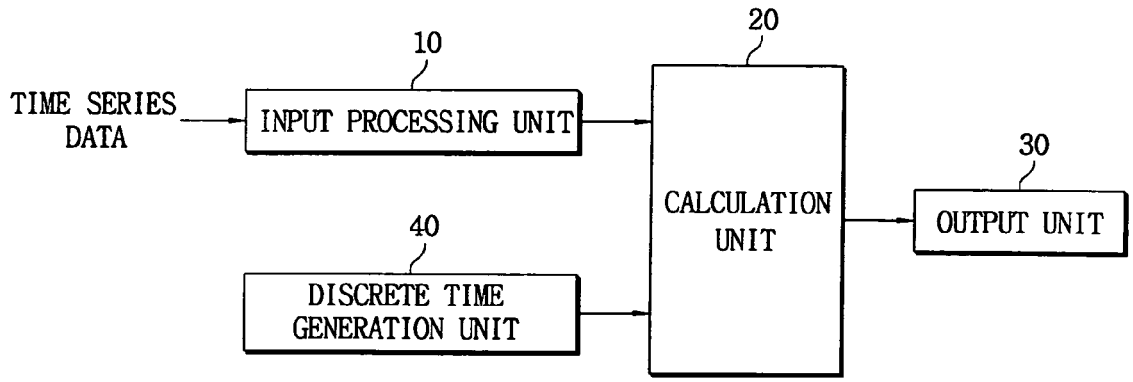
FIG. 2 is a schematic block diagram of hardware for performing a method of estimating the parameters of time series data according to the present invention.

FIG. 2 is a schematic block diagram of hardware for performing a method of estimating the parameters of time series data according to the present invention. The hardware for performing the parameter estimation method of the present invention may include an input processing unit 10, a calculation unit 20, an output unit 30 and a discrete time generation unit 40.

The input processing unit 10 performs Analog-to-Digital (A/D) conversion with respect to the input analog time series data, and applies A/D conversion results to the calculation unit 20.

The calculation unit 20 estimates a mode by performing a Fourier transform with respect to the time series data, received from the input processing unit 10, estimates the parameters of the time series data on the basis of the estimated mode, and also determines the stability/instability of a system to which the time series data are to be inputted.

The output unit 30 outputs the estimated mode, the parameter estimation results and determination results on the stability/instability of the system that are outputted from the calculation unit 20.

The discrete time generation unit 40 generates discrete time data, which is the time information required for the Fourier transform performed by the calculation unit, and provides the discrete time data to the calculation unit 20.

Hereinafter, the embodiments of the present invention performed by the hardware having the above construction are described in detail.

The present invention relates to a method of directly obtaining parameters and modes indicating the status of a system on the basis of the Fourier transform of time series data, and includes a first embodiment for obtaining a mode on the basis of a Fourier spectrum to estimate parameters, a second embodiment for obtaining a mode on the basis of a power spectrum to estimate parameters, and a third embodiment for obtaining respective modes on the basis of a Fourier spectrum and a power spectrum and selecting one of the two modes to estimate parameters.

Further, the present invention includes a fourth embodiment for obtaining a mode on the basis of the ratio of Fourier spectrums to estimate parameters, and a fifth embodiment for obtaining a mode on the basis of the ratio of power spectrums to estimate parameters.

First, the principles applied to the first to fifth embodiments of the present invention are described below.

The Fourier transform of a continuous function is given in Equation [1].

$$X(\omega) = \int_{-\infty}^{+\infty} x(t) e^{-j\omega t} dt \quad [1]$$

Actually, signals given by time series data are rarely periodic, but mostly non-periodic. The discrete Fourier transform of a signal x[n] defined over an interval $0 \leq n \leq N-1$ is expressed in the following Equation [2], and a spectrum coefficient X[k] is defined over an interval $0 \leq n \leq N-1$.

$$X[k] = \sum_{n=0}^{N-1} x[n] e^{-j\frac{2\pi kn}{N}} \quad [2]$$

If the sampling interval of a discrete signal is T, and a non-periodic signal present in a time domain $T_0$ is sampled by N, $T_0$ is expressed by $T_0 = NT$ seconds. That is, the spectrum of this signal is represented by 1/NT [Hz] or 2π/NT [rad/sec] in a frequency domain.

Figure 3:
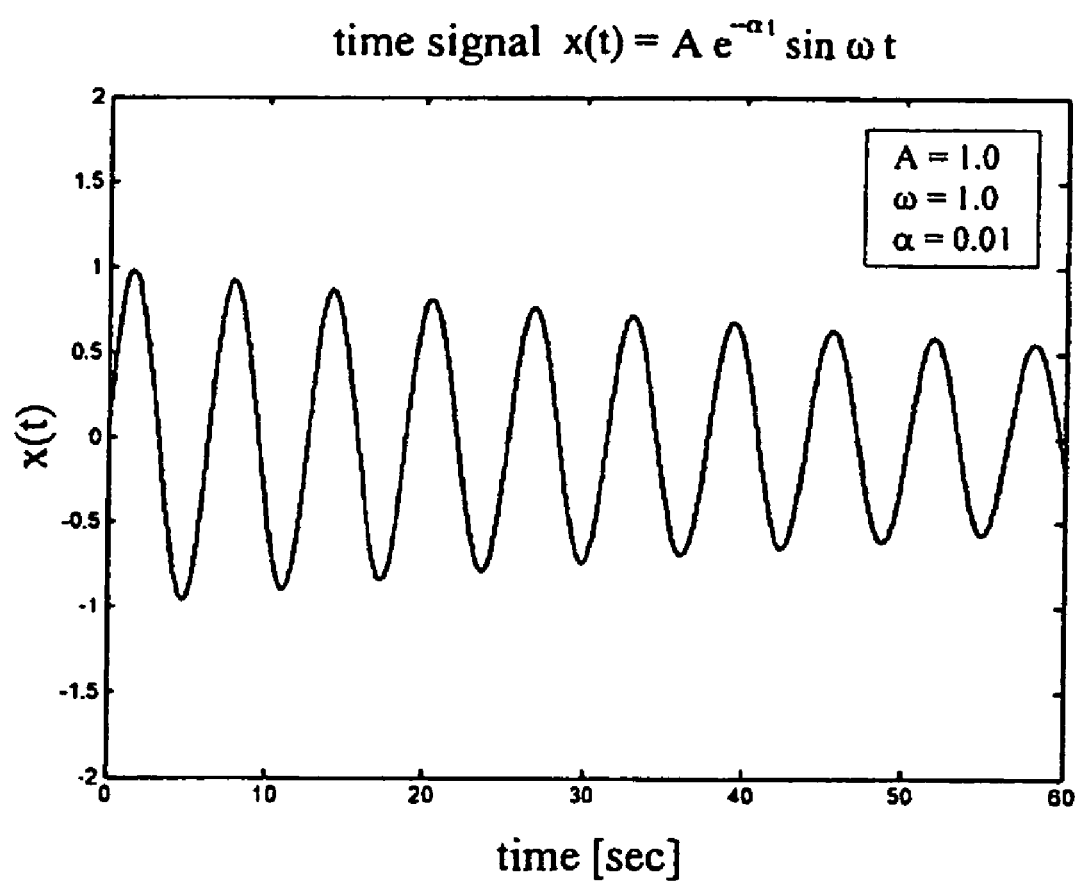
FIG. 3 is a waveform diagram of an exponentially damped sine wave.

If it is assumed that a continuous function x(t) is a function, such as $x(t) = A e^{-\alpha t} \sin \omega_1 t$ expressed by the multiplication of a sine function having a frequency of $\omega_1$ by an exponential function having a damping factor $\alpha$, and the damping factor $\alpha$ satisfies $\alpha << 1$, the time series data become a sine wave that is exponentially damped as shown in FIG. 3, that is, an exponentially damped sine function.

Figure 5:
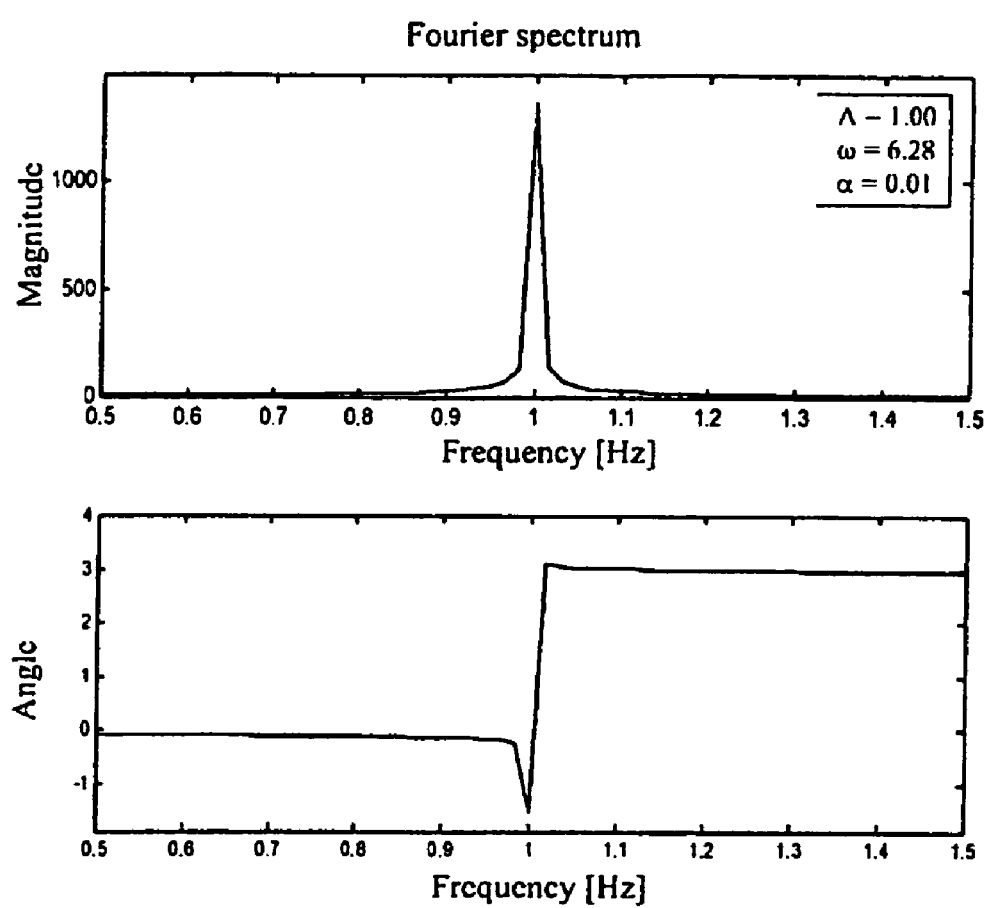
FIG. 5 is a waveform diagram showing an example of a Fourier spectrum of an exponentially damped sine function.

If a time function x(t) is Fourier transformed, a spectrum X(ω) is expressed as a complex function, which has the magnitude and phase of FIG. 4. Further, if the magnitude A of the continuous function x(t) is A=1, and the damping factor and the frequency thereof are $\alpha=0.01$ and $f_1=1$, respectively, X(ω) is shown in FIG. 5.

Similar to a sine function, if it is assumed that a continuous function x(t) is an exponentially damped cosine function, such as $x(t) = A e^{-\alpha t} \sin \omega_1 t$ expressed by the multiplication of a cosine function having a frequency of $\omega_1$ by an exponential function having a damping factor $\alpha$, the Fourier transform X(ω) is expressed as a complex function, which has the magnitude and phase of FIG. 6.

Figure 7:
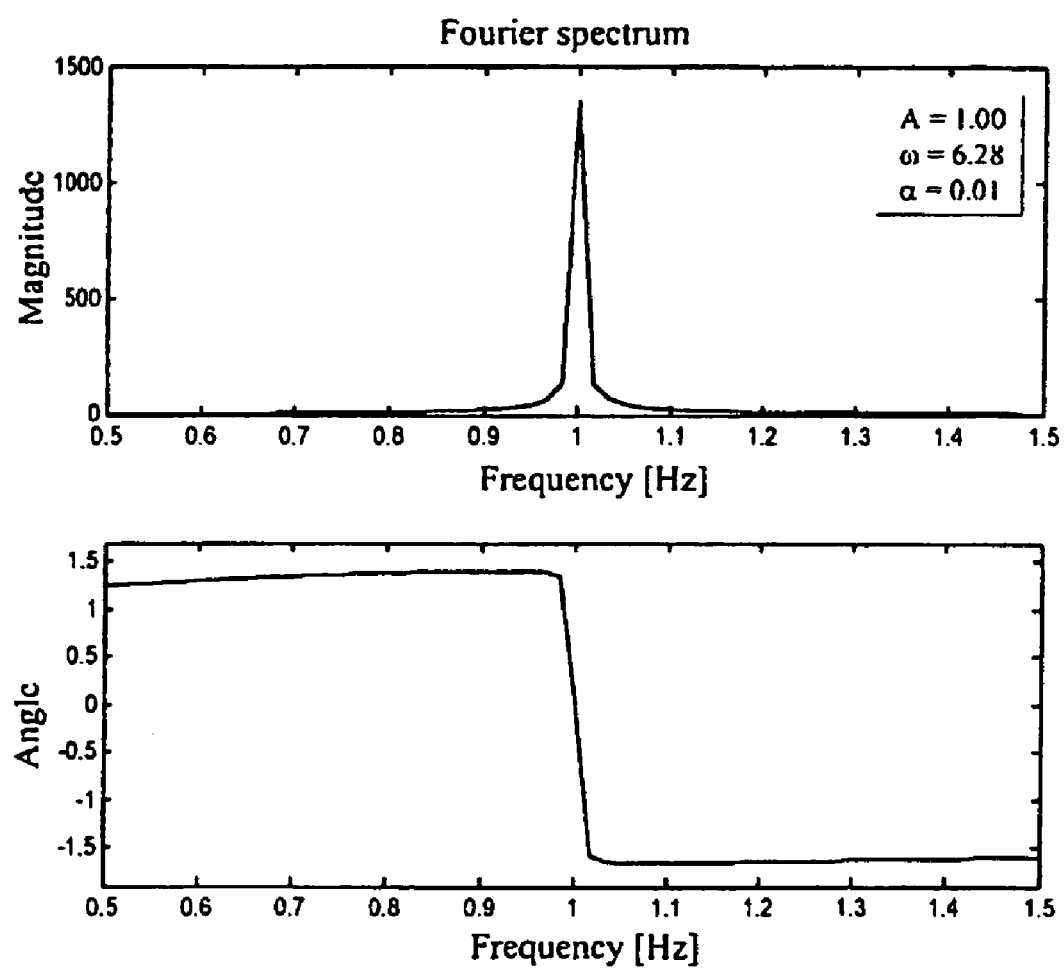
FIG. 7 is a waveform diagram showing an example of a Fourier spectrum of an exponentially damped cosine function.

Further, if the magnitude A of the continuous function x(t) is A=1, and the damping factor and the frequency thereof are $\alpha=0.01$ and $f_1=1$, respectively, the magnitude and the phase of the Fourier spectrum are shown in FIG. 7. When the real part α of the mode in FIGS. 5 and 7 is small, a peak value is formed, and the inversion of a phase angle occurs at the peak frequency.

A power spectrum is defined as the square of the magnitude of a Fourier spectrum. The power spectrum ζ(ω) of the exponentially damped sine function of FIG. 4 is expressed in the following Equation [3], and the power spectrum of the exponentially damped cosine function is expressed in the following Equation [4].

$$\wp(\omega) = \frac{A^2 \omega_1^2}{(\alpha^2 + \omega_1^2 - \omega^2)^2 + (2\alpha\omega)^2} \quad [3]$$

$$\wp(\omega) = \frac{A^2(\alpha^2 + \omega^2)}{(\alpha^2 + \omega_1^2 - \omega^2)^2 + (2\alpha\omega)^2} \quad [4]$$

Figure 8:
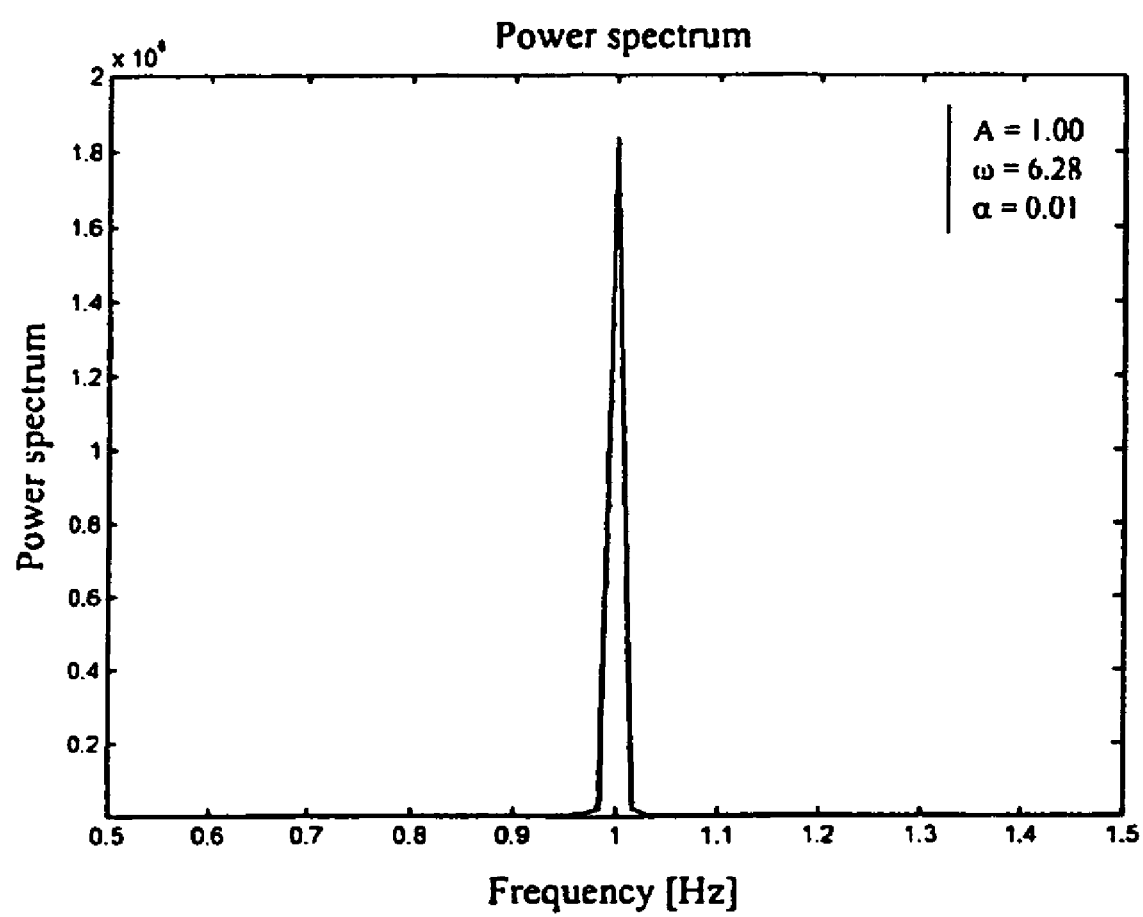
FIG. 8 is a waveform diagram showing an example of a power spectrum of a sinusoidal exponentially damped function at a low frequency.

The power spectrum of a sinusoidal exponentially damped function at a low frequency is depicted in FIG. 8. The power spectrum has a higher peak value than that of the Fourier spectrum of FIG. 4 at a peak frequency when the shape of the power spectrum is identical to that of the spectrum of FIGS. 5 and 7 and the real part α of the mode is low.

In a discrete Fourier transform, the frequency of given time series data can be recognized rapidly and precisely. Since most time series data are not sine waves or cosine waves, a Fourier spectrum or power spectrum has a continuous envelope shape near a dominant frequency of the time series data.

Figure 9:
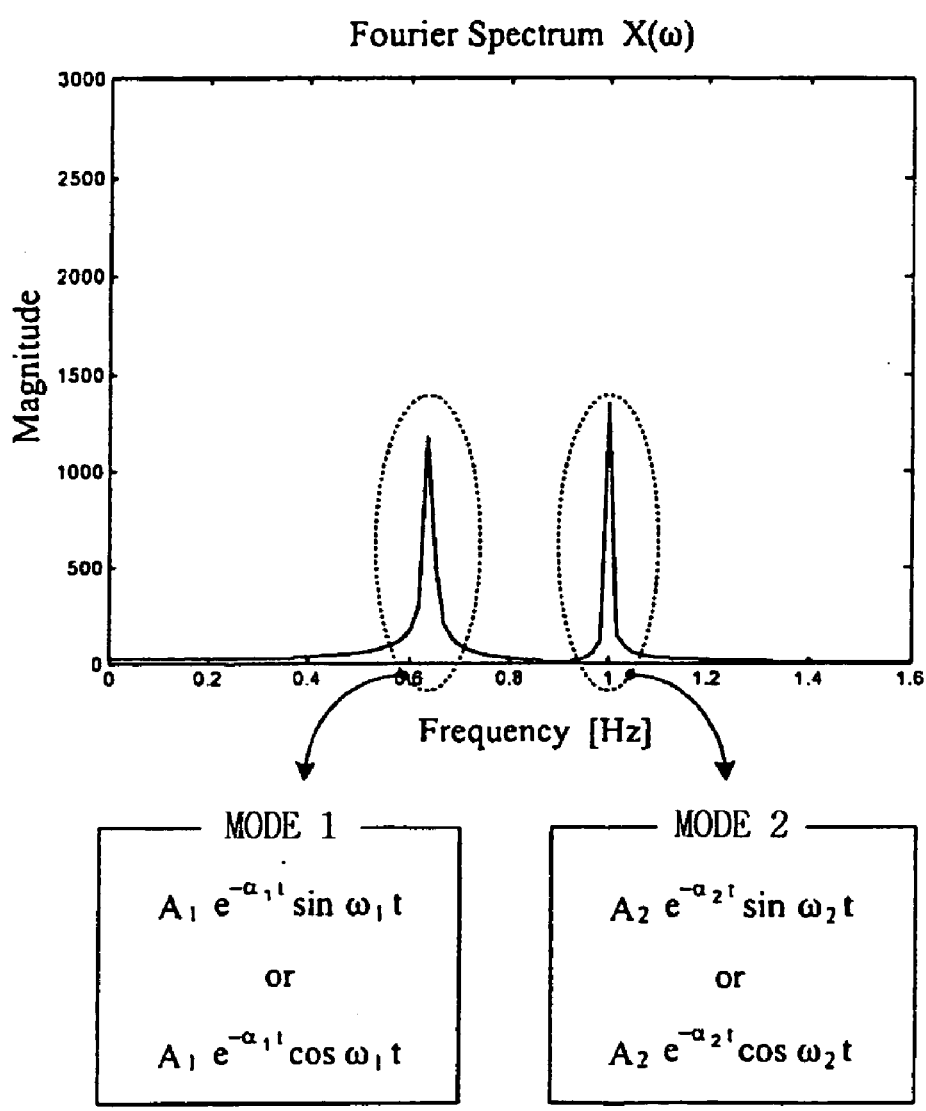
FIG. 9 is a waveform diagram showing an example of a spectrum of a complex exponential function.

Therefore, all frequency domain data near the peak frequency $\omega_1$ existing in the Fourier spectrum or power spectrum of time series data are inversely transformed into a complex exponential function having a magnitude A, a damping factor α and a peak frequency $\omega_1$ as expressed in the following Equation [5] or [6] (refer to FIG. 9).

$$x(t) = A e^{-\alpha t} \sin \omega_1 t \quad [5]$$

$$x(t) = A e^{-\alpha t} \cos \omega_1 t \quad [6]$$

The above-described power spectrum of Equation [3] is simply expressed by the following Equation [7] when $\omega_1 >> \alpha$ at frequency $\omega = \omega_1$. That is, the power spectrum is proportional to the square of the magnitude of the time function, and inversely proportional to the square of the damping factor α.

$$\wp(\omega_1) = \frac{A^2}{4\alpha^2} \quad [7]$$

Further, a power spectrum ζ($\omega_1 \pm \alpha$) at frequency $\omega = \omega_1 \pm \alpha$ is given by the following Equation [8].

$$\wp(\omega_1 \pm \alpha) = \frac{A^2 \omega_1^2}{4\alpha^2 \{\omega_1^2 + (\omega_1 \pm \alpha)^2\}} \quad [8]$$

In particular, if the damping factor $\alpha$ is much smaller than the frequency, and a relationship $\omega_1 \gg \alpha$ is satisfied, $\omega_1 \pm \alpha \approx \omega_1$ is realized in Equation [8], so that the damping factor $\alpha$ may be ignored. Therefore, Equation [8] is simply expressed by the following Equation [9].

$$\wp(\omega_1 \pm \alpha) = \frac{1}{2}\left(\frac{A^2}{4\alpha^2}\right) \quad [9]$$

Therefore, when the frequency varies by the real number of the mode, a relationship of Equation [10] is satisfied between the power spectrum and a peak power spectrum.

$$\wp(\omega_1 \pm \alpha) = \frac{1}{2}\wp(\omega_1) \quad [10]$$

Equation [10] means that the difference between the frequency of the power spectrum corresponding to 50% of the peak power spectrum $\zeta(\omega_1)$ and the peak frequency is the real part of the mode.

Figure 10:
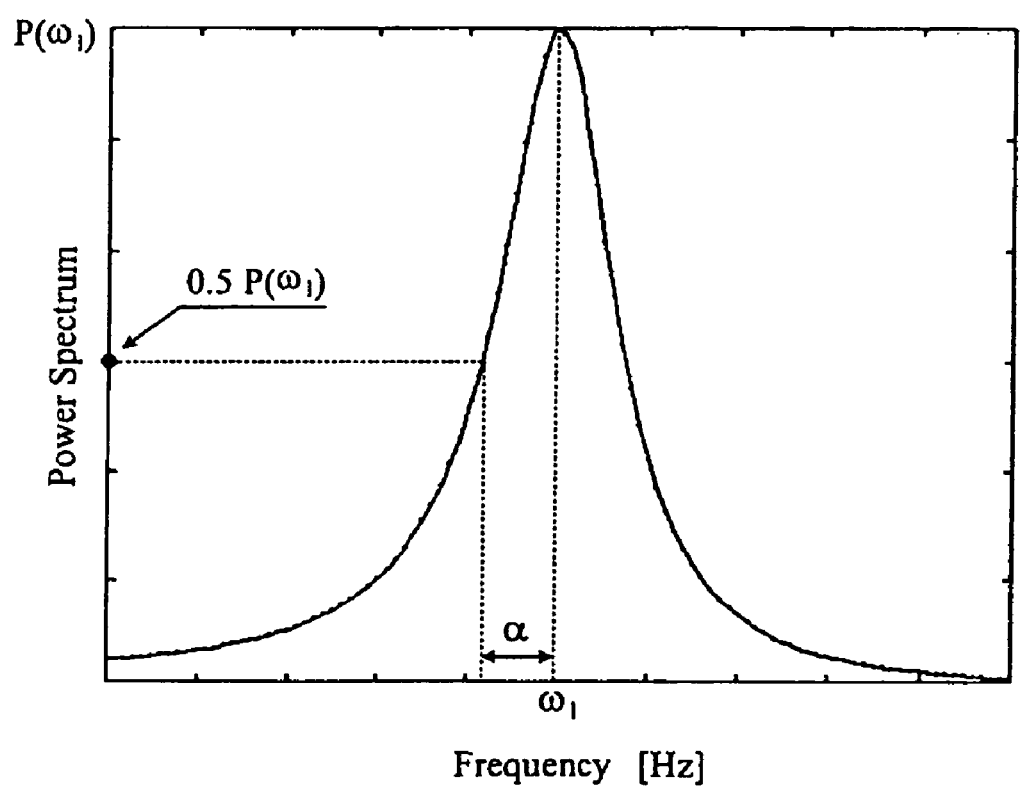
FIG. 10 is a waveform diagram showing a relationship between the real part of a mode and a peak spectrum in a power spectrum.

That is, if the frequency corresponding to the power spectrum $0.5\, \zeta(\omega_1)$ is $\omega_\alpha$, the real part of the mode is defined in the following Equation [11], and a relationship between the power spectrum and the real part is shown in FIG. 10.

$$\alpha = |\omega_1 - \omega_\alpha| \quad [11]$$

Results that have been described are also satisfied with respect to the exponentially damped cosine function of Equation [6]. In Equation [6], if $\omega_1 \gg \alpha$, the same results as those of Equation [11] are obtained. Therefore, in the Fourier transform of arbitrary time series data, even though the power spectrum of a peak value is simulated using an exponentially damped sine function or exponentially damped cosine function, the same damping factor is obtained.

Results similar to those of Equation [11] can be equally obtained from the Fourier spectrum $|X(\omega)|$. That is, when $\omega_1 \gg \alpha$, the following relationship is satisfied between $|X(\omega_1)|$ and $|X(\omega_1+\alpha)|$.

$$|X(\omega_1+\alpha)| = \frac{1}{\sqrt{2}}|X(\omega_1)| \text{ or } |X(\omega_1+\alpha)| = 0.707|X(\omega_1)| \quad [12]$$

Equation [12] means that the difference between the frequency of a spectrum corresponding to 70.7% of the magnitude of the spectrum $X(\omega_1)$ and the peak frequency is the real part of a mode. That is, if the frequency corresponding to $0.707\, X(\omega_1)$ in the spectrum is $\omega_\alpha$, the real part of the mode is defined as in Equation [11].

If both terms of Equation [12] are squared, respectively, it can be seen that results perfectly identical to those obtained from the power spectrum can be obtained.

Figure 11:
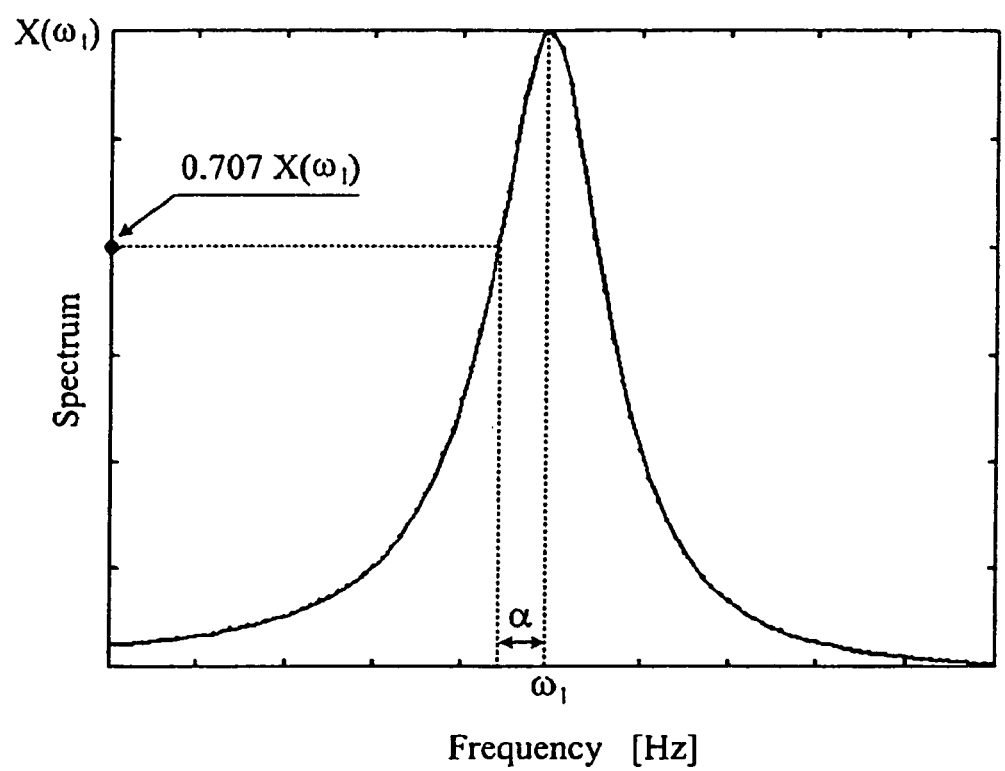
FIG. 11 is a waveform diagram showing a relationship between the real part of a mode and a peak spectrum in a Fourier spectrum.

Even though the magnitude of a Fourier spectrum is used, the damping factor identical to that of a power spectrum can be obtained. In this case, a proportional factor is $1/\sqrt{2}$ as in Equation [12]. A relationship between the real part of a mode and a peak spectrum in a Fourier spectrum is shown in FIG. 11.

Hereinbefore, the method of estimating a damping factor corresponding to the real part of a mode using a Fourier spectrum and a power spectrum corresponding to a peak frequency has been described.

Hereinafter, a method of obtaining a mode using the ratio of Fourier spectrums and the ratio of power spectrums is described.

If the ratio of the power spectrum $\zeta(\omega_2)$ at frequency $\omega=\omega_2$ to the power spectrum $\zeta(\omega_1)$ at frequency $\omega=\omega_1$ is $r_p$, the ratio can be expressed in the following Equation [13].

$$r_p = \frac{\wp(\omega_2)}{\wp(\omega_1)} \quad (r_p < 1) \quad [13]$$

When frequency $\omega=\omega_2$, a power spectrum can be expressed in the following Equation [14].

$$\wp(\omega_2) = \frac{(A\omega_1)^2}{(\alpha^2+\omega_1^2-\omega_2^2)^2+(2\alpha\omega_2)^2} \quad [14]$$

If Equation [14] is applied to Equation [13] and then arranged in brief a quadratic equation, such as the following Equation [15], can be obtained, $$ax^2+bx+c=0 \quad [15]$$

where the coefficients of the quadratic equation are expressed in the following Equation [16].

$$a=r_p-1$$
$$b=2r_p(\omega_1^2+\omega_2^2)-4\omega_1^2$$
$$c=r_p(\omega_1^2-\omega_2^2)^2 \quad [16]$$

Further, the relationship of the following Equation [17] is satisfied between the damping factor $\alpha$ and the solution x of the quadratic equation.

$$\alpha = \sqrt{\sqrt{x}} \quad [17]$$

Therefore, the solution x of the equation and the damping factor $\alpha$ can be calculated on the basis of the power spectrum corresponding to an arbitrary frequency $\omega_2$ nearby the peak frequency and the peak power spectrum, so that the real part of the mode can be obtained.

A mode can be estimated by developing Equations with respect to the magnitude $X(\omega)$ of the Fourier spectrum in the same manner as the above.

In the magnitude of the Fourier spectrum of FIG. 4, the ratio of the magnitude of the Fourier spectrum at frequency $\omega_2$ to the magnitude of the Fourier spectrum at frequency $\omega_1$ is assumed to be $r_s$, and defined by the following Equation [18].

$$r_s = \frac{X(\omega_2)}{X(\omega_1)} \quad (r_s < 1) \quad [18]$$

If the magnitudes of respective Fourier spectrums are applied to Equation [18] and arranged, the quadratic equation equal to that of Equation [15] as in the above-described power spectrum can be obtained. However, if the magnitude of the spectrum is applied, the coefficients of the quadratic equation are expressed in Equation [19], and the damping factor $\alpha$ is expressed in Equation [17].

$$a=r_s^2-1$$
$$b=2r_s^2(\omega_1^2-\omega_2^2)-4\omega_1^2$$
$$c=r_s(\omega_1^2-\omega_2^2)^2 \quad [19]$$

Hereinbefore, the method of estimating the real part of a mode has been described.

Hereinafter, a method of obtaining the magnitude of a time series response given in the above-described Equations [5] and [6] is described.

Generally, the magnitude A of a time function corresponding to each frequency in measured time series data cannot be recognized. The magnitude A of the time series data is calculated from the real part of the mode and the power spectrum that have been calculated above. When $\omega=\omega_1$ in Equation [3], the magnitude A is expressed as the following Equation [20].

$$\wp(\omega_1) = \frac{(A\omega_1)^2}{\alpha^4 + (2\alpha\omega_1)^2} \quad [20]$$

If Equation [20] is arranged about the magnitude A, the following Equation [21] is obtained, so that the magnitude A of the time series data expressed by an exponentially damped function can be obtained.

$$A = \frac{\alpha\sqrt{\alpha^2 + 4\omega_1^2}}{\omega_1} X(\omega_1) \quad [21]$$

In a specific case, when $\omega_1 >> \alpha$, Equation [21] is simply expressed as in the following Equation [22].

$$A = 2\alpha |X(\omega_1)| \quad [22]$$

In Equation [22], it can be seen that a peak spectrum is proportional to the magnitude A and inversely proportional to the damping factor $\alpha$. It can be seen that, if the damping factor $\alpha$ approaches 0, $$\lim_{\alpha \to 0} X(\omega_1) \cong \infty$$

is satisfied. In this case, as the damping factor $\alpha$ approaches 0, the peak value of the Fourier spectrum or power spectrum increases.

Using the above-described method, all parameters of a time domain response can be estimated. In particular, a mode or eigenvalue $\lambda$ required for the analysis of a dynamic system is expressed by a combination of a damping factor and a frequency, as in the following Equation [23].

$$\lambda = -\alpha + j\omega \quad [23]$$

The above-described technical principles are applied to the first to fifth embodiments of the present invention, which are described in detail.

First Embodiment

Figure 12:
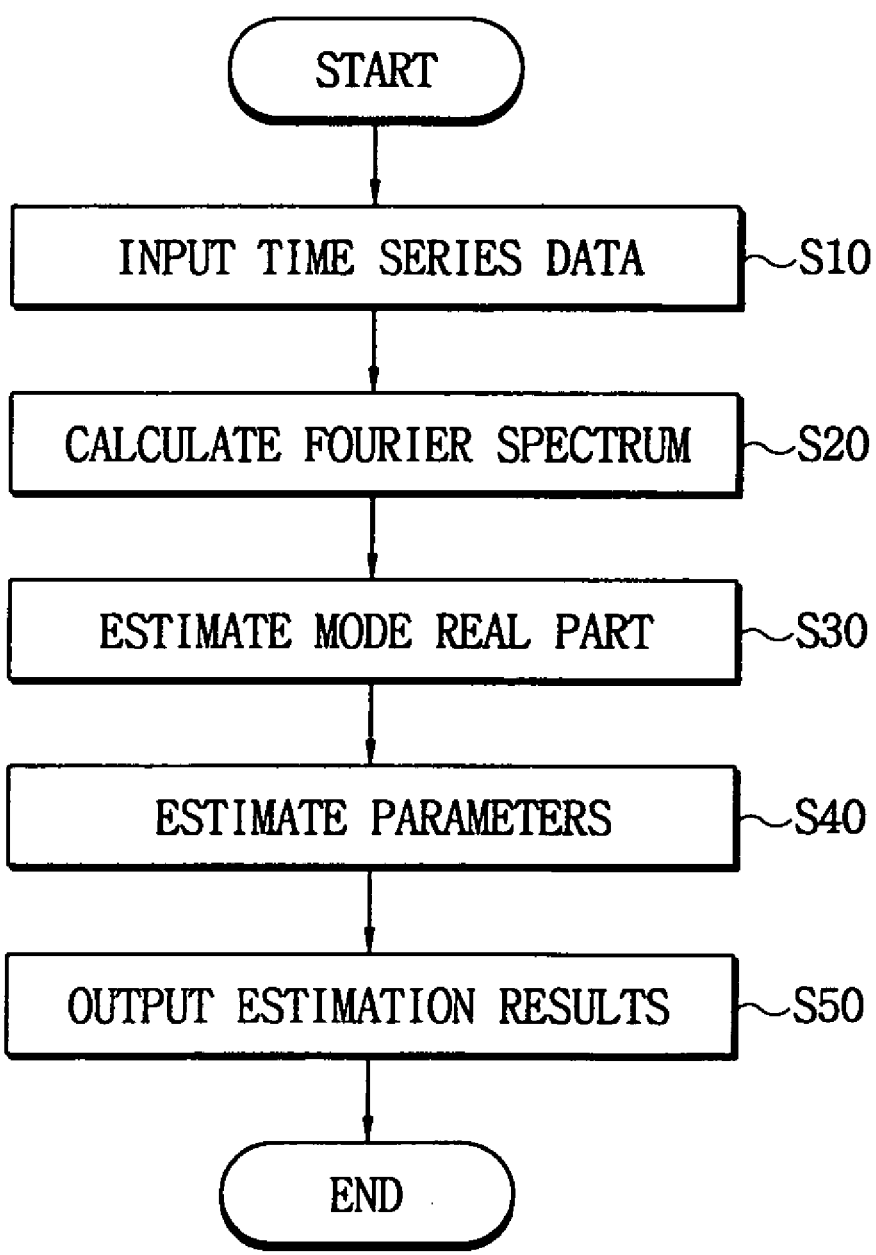
FIG. 12 is a flowchart showing an operating process in brief according to a first embodiment of the present invention.

The first embodiment of the present invention is a method of obtaining a mode on the basis of a Fourier spectrum to estimate parameters using the above-described principles, which is schematically depicted in FIG. 12.

That is, as shown in FIG. 12, the first embodiment of the present invention includes the step S10 of inputting time series data to the calculation unit 20 through the input processing unit 10, and the step S20 of the calculation unit 20 performing a Fourier transform with respect to the input time series data to calculate a Fourier spectrum.

Further, the first embodiment of the present invention includes the step S30 (refer to Equations [11] and [12]) of the calculation unit 20 obtaining a real part (damping factor) of a mode by subtracting the frequency of the Fourier spectrum corresponding to $1/\sqrt{2}$ of the magnitude of the Fourier spectrum calculated at step S20 from a peak frequency.

In detail, at step S30, a spectrum $X(\omega_2)$ corresponding to 70.7% of a spectrum $X(\omega_1)$ in Equation [12] is calculated, an x-axis frequency $\omega_2$ corresponding to the spectrum $X(\omega_2)$ is estimated, and then the real part $\alpha$ of a mode is estimated in Equation [11].

Further, the first embodiment of the present invention includes the step S40 (refer to Equations [20] to [23]) of the calculation unit 20 estimating the parameters of the time series data (for example, the real part and the imaginary part of the mode, and the magnitude of a time series response) on the basis of the Fourier spectrum calculated at step S20 and the real part of the mode obtained at step S30, and the step S50 of outputting the results estimated by the calculation unit 20 through the output unit 30.

In detail, at step S40, the mode $\lambda = -\alpha + j\omega$ is estimated on the basis of the real part of the mode obtained at step S30 and the peak frequency at the time of estimating parameters, and is then applied to Equation [20], so that a parameter A is estimated.

Second Embodiment

Figure 13:
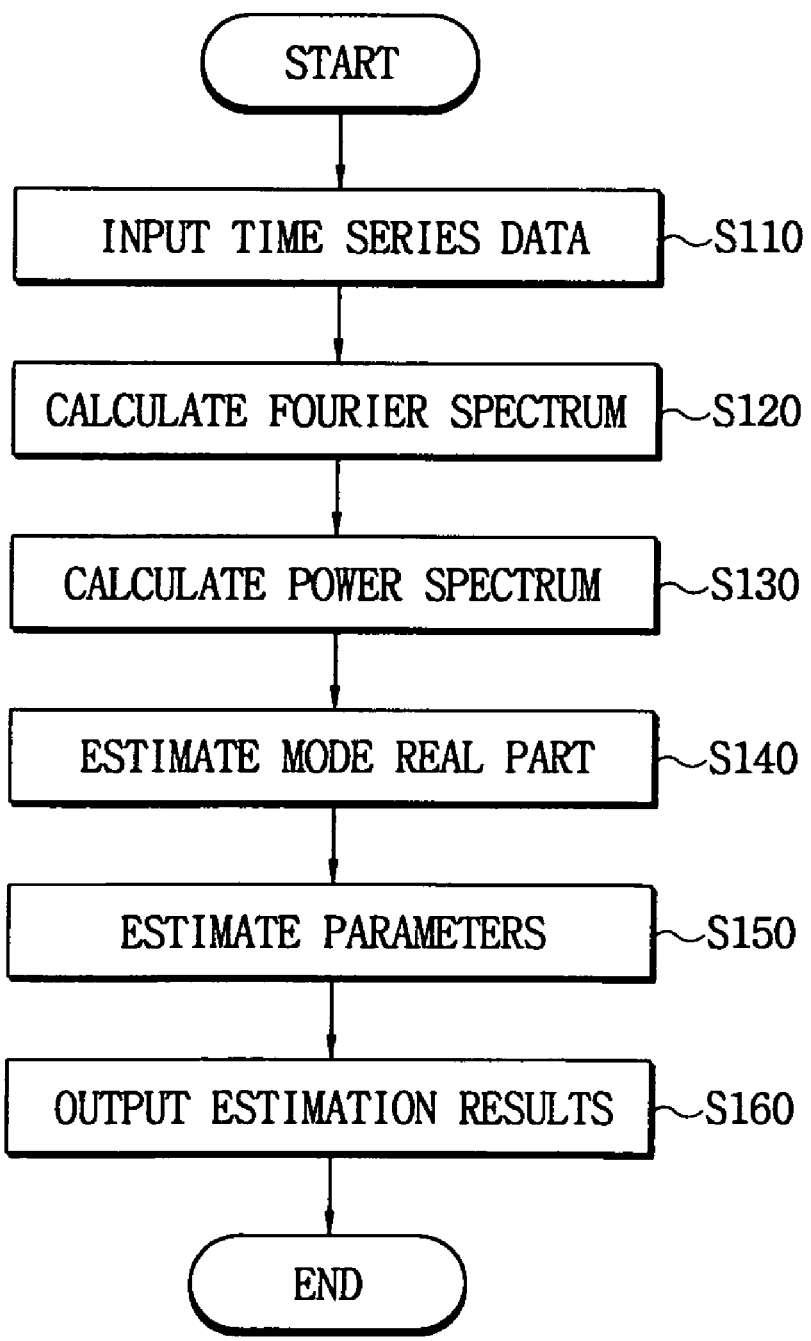
FIG. 13 is a flowchart showing an operating process in brief according to a second embodiment of the present invention.

The second embodiment of the present invention is a method of obtaining a mode on the basis of a power spectrum to estimate parameters using the above-described principles, which is schematically depicted in FIG. 13.

That is, as shown in FIG. 13, the second embodiment of the present invention includes the step S110 of inputting time series data to the calculation unit 20 through the input processing unit 10, the step S120 of the calculation unit 20 performing a Fourier transform with respect to the input time series data to calculate a Fourier spectrum, and the step S130 (refer to Equations [3] and [4]) of the calculation unit 20 calculating a power spectrum on the basis of the calculated Fourier spectrum.

For reference, at step S130, since the power spectrum is a complex vector, the magnitude thereof is calculated by multiplying respective elements of a conjugate complex vector $\overline{X(\omega)}$ by each other, as expressed in Equation [100], at the time of calculating the power spectrum on the basis of the Fourier spectrum. If the peak spectrum has a high number (for example, $10^5$ or above), a mean power spectrum, obtained by dividing the power spectrum by the number N of pieces of spectrum data, is used, as expressed in Equation [200].

$$\zeta(\omega) = |X(\omega) * \overline{X(\omega)}| \quad [100]$$

$$\zeta_{avg}(\omega) = \zeta(\omega)/N \quad [200]$$

Further, the second embodiment of the present invention includes the step S140 (refer to Equations [10] and [11]) of the calculation unit 20 obtaining the real part of a mode (damping factor) by subtracting the frequency of the power spectrum corresponding to ½ of the magnitude of the power spectrum calculated at step S130 from a peak frequency.

In detail, at step S140, a power spectrum $\zeta(\omega_2)$ corresponding to 50% of the power spectrum at the peak frequency as expressed in Equation [10] is calculated, an x-axis frequency $\omega_2$ corresponding to the power spectrum is calculated, and then the real part $\alpha$ of the mode is estimated in Equation [11].

The second embodiment of the present invention includes the step S150 (refer to Equations [20] to [23]) of the calculation unit 20 estimating the parameters of the time series data (for example, the real part and the imaginary part of the mode, and the magnitude of a time series response) on the basis of the power spectrum calculated at step S130 and the real part of the mode obtained at step S140, and the step S160 of outputting the results estimated by the calculation unit 20 through the output unit 30.

In detail, at step S150, a mode $\lambda=-\alpha+j\omega$ is estimated on the basis of the real part of the mode obtained at step S140 and the peak frequency at the time of estimating parameters, and is then applied to Equation [20], so that a parameter A is estimated.

Third Embodiment

Figure 14:
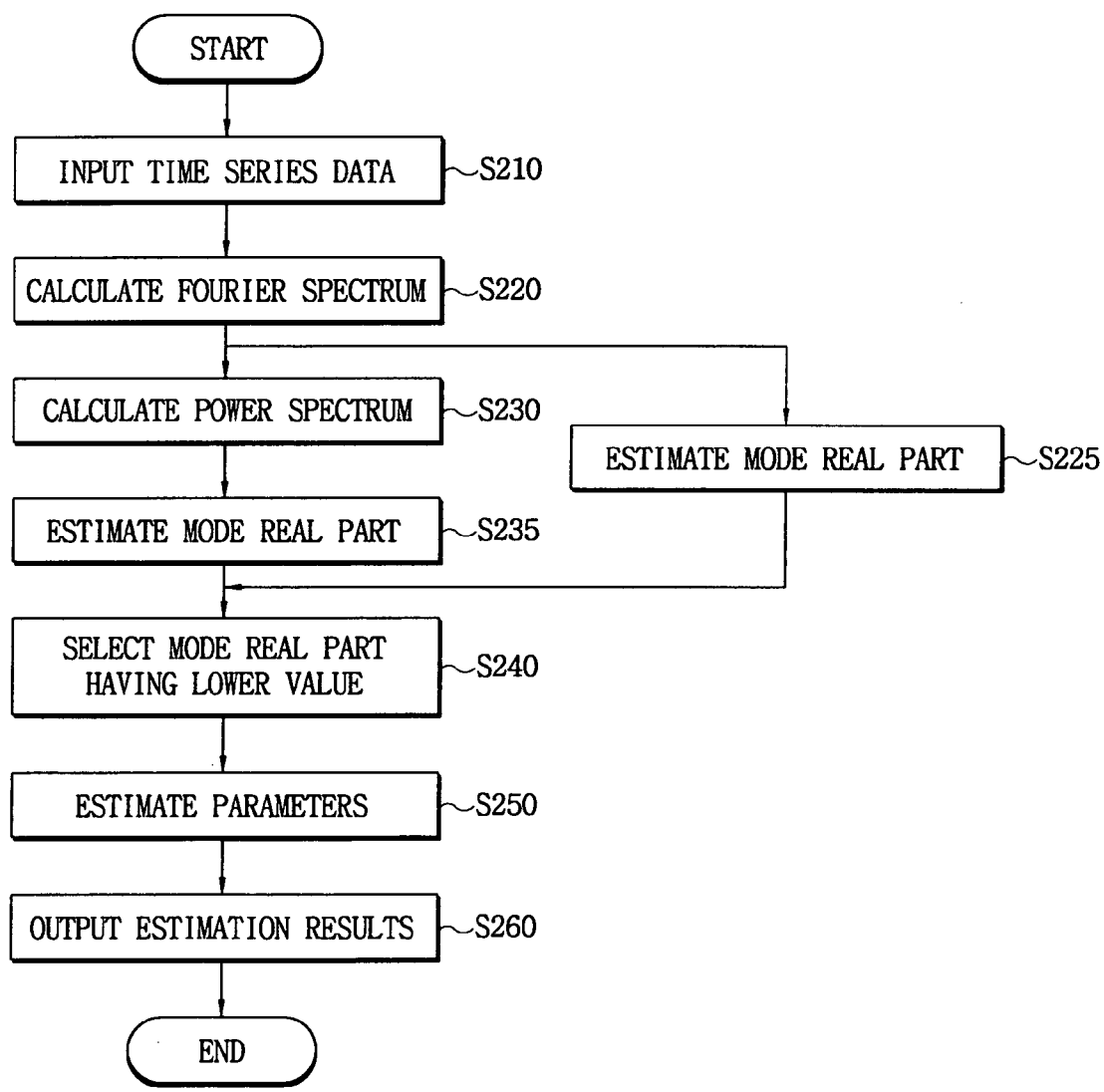
FIG. 14 is a flowchart showing an operating process in brief according to a third embodiment of the present invention.

The third embodiment of the present invention is a method of obtaining respective modes on the basis of a Fourier spectrum and a power spectrum using the above-described principles and selecting one of the modes to estimate parameters, which is schematically depicted in FIG. 14.

That is, as shown in FIG. 14, the third embodiment of the present invention includes the step S210 of inputting time series data to the calculation unit 20 through the input processing unit 10, the step S220 of the calculation unit 20 performing a Fourier transform with respect to the input time series data to calculate a Fourier spectrum, and the step S225 (refer to Equations [11] and [12]) of the calculation unit 20 obtaining the real part of a mode (damping factor) by subtracting the frequency of the Fourier spectrum corresponding to $1/\sqrt{2}$ of the magnitude of the Fourier spectrum calculated at step S220 from a peak frequency.

Further, the third embodiment of the present invention includes the step S230 (refer to Equations [3] and [4]) of the calculation unit 20 calculating a power spectrum on the basis of the calculated Fourier spectrum, and the step S235 (refer to Equations [10] and [11]) of obtaining the real part of a mode (damping factor) by subtracting the frequency of the power spectrum corresponding to ½ of the magnitude of the power spectrum calculated at step S230 from a peak frequency.

Further, the third embodiment of the present invention includes the step S240 of the calculation unit 20 comparing the real part of the mode obtained at step S225 with the real part of the mode obtained at step S235 and selecting a real part having a relatively low value from the real parts.

Further, the third embodiment of the present invention includes the step S250 (refer to Equations [20] to [23]) of the calculation unit 20 estimating the parameters of the time series data (for example, the real part and imaginary part of the mode, and the magnitude of a time series response) on the basis of the real part of the mode selected at step S240 and the spectrum from which the real part of the selected mode is derived (that is, one of the Fourier spectrum and the power spectrum), and the step S260 of outputting the results estimated by the calculation unit 20 through the output unit 30.

Fourth Embodiment

Figure 15:
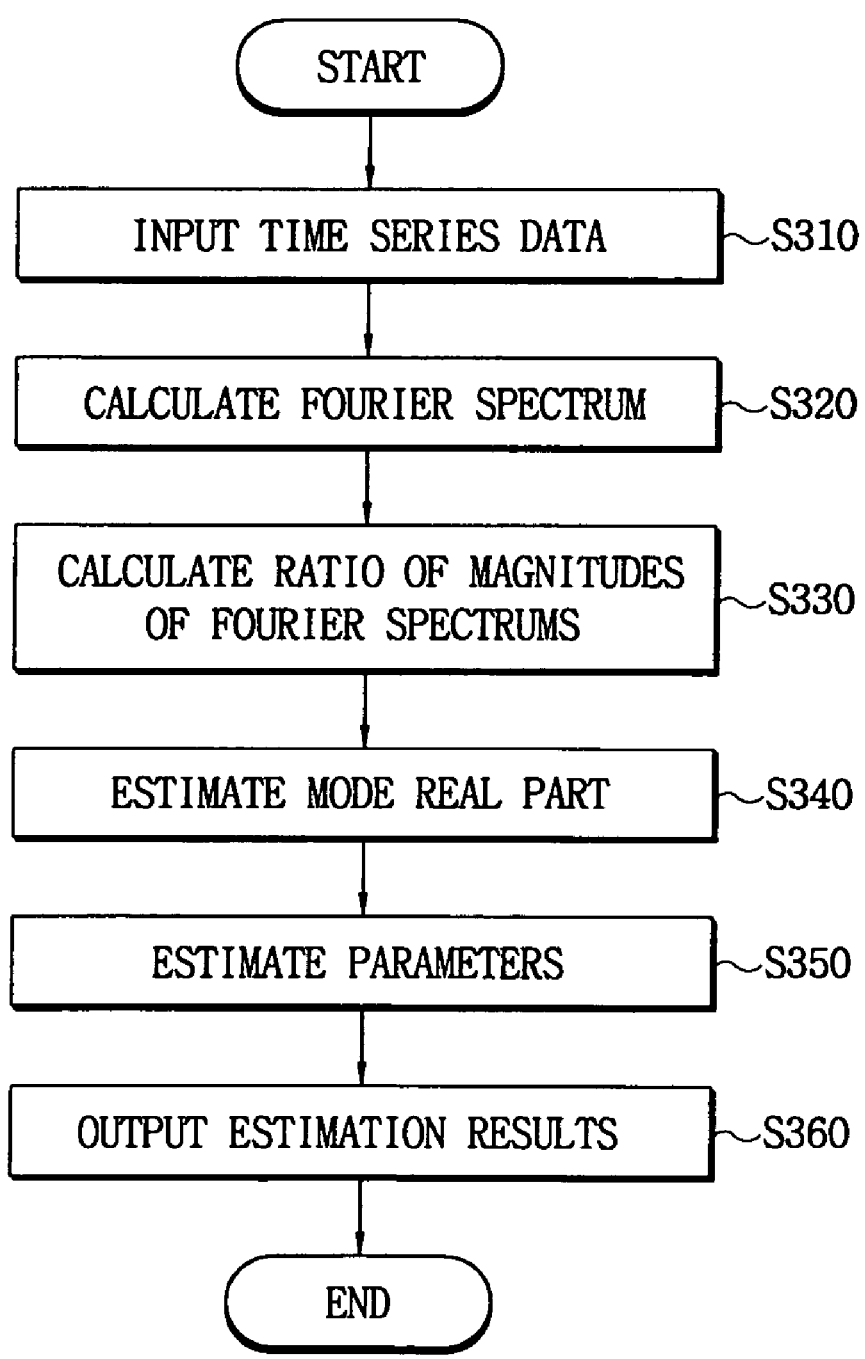
FIG. 15 is a flowchart showing an operating process in brief according to a fourth embodiment of the present invention.

The fourth embodiment of the present invention is a method of obtaining a mode on the basis of the ratio of Fourier spectrums to estimate parameters using the above-described principles, which is schematically depicted in FIG. 15.

That is, as shown in FIG. 15, the fourth embodiment of the present invention includes the step S310 of inputting time series data to the calculation unit 20 through the input processing unit 10, and the step S320 of the calculation unit 20 performing a Fourier transform with respect to the input time series data to calculate a Fourier spectrum.

Further, the fourth embodiment of the present invention includes the step S330 (Equation [18]) of the calculation unit 20 calculating the ratio of the magnitude of a Fourier spectrum corresponding to a second arbitrary frequency within a preset range around a peak frequency of the Fourier spectrum calculated at step S320 to the magnitude of the Fourier spectrum corresponding to a first arbitrary frequency within a preset range around the peak frequency.

For reference, a method of selecting the first and second arbitrary frequencies is performed to select frequencies having highest absolute values among the values, obtained by subtracting neighboring spectrums (power spectrums) from each other, as the first and second arbitrary frequencies. In most cases, the highest values are obtained at the peak values of the Fourier spectrum.

Further, the fourth embodiment of the present invention includes the step S340 (refer to Equation [17]) of the calculation unit 20 applying the ratio of the magnitudes of the Fourier spectrums obtained at step S330 to both the Fourier spectrum corresponding to the first arbitrary frequency and the Fourier spectrum corresponding to the second arbitrary frequency, obtaining a quadratic equation (Equations [15] and [19]), obtaining the solution of the quadratic equation and then obtaining the real part of a mode.

Further, the fourth embodiment of the present invention includes the step S350 (refer to Equations [20] to [23]) of the calculation unit 20 estimating the parameters of the time series data (for example, the real part and imaginary part of the mode, and the magnitude of a time series response) on the basis of the real part of the mode obtained at step S340, and the step S360 of outputting the results estimated by the calculation unit 20 through the output unit 30.

Fifth Embodiment

Figure 16:
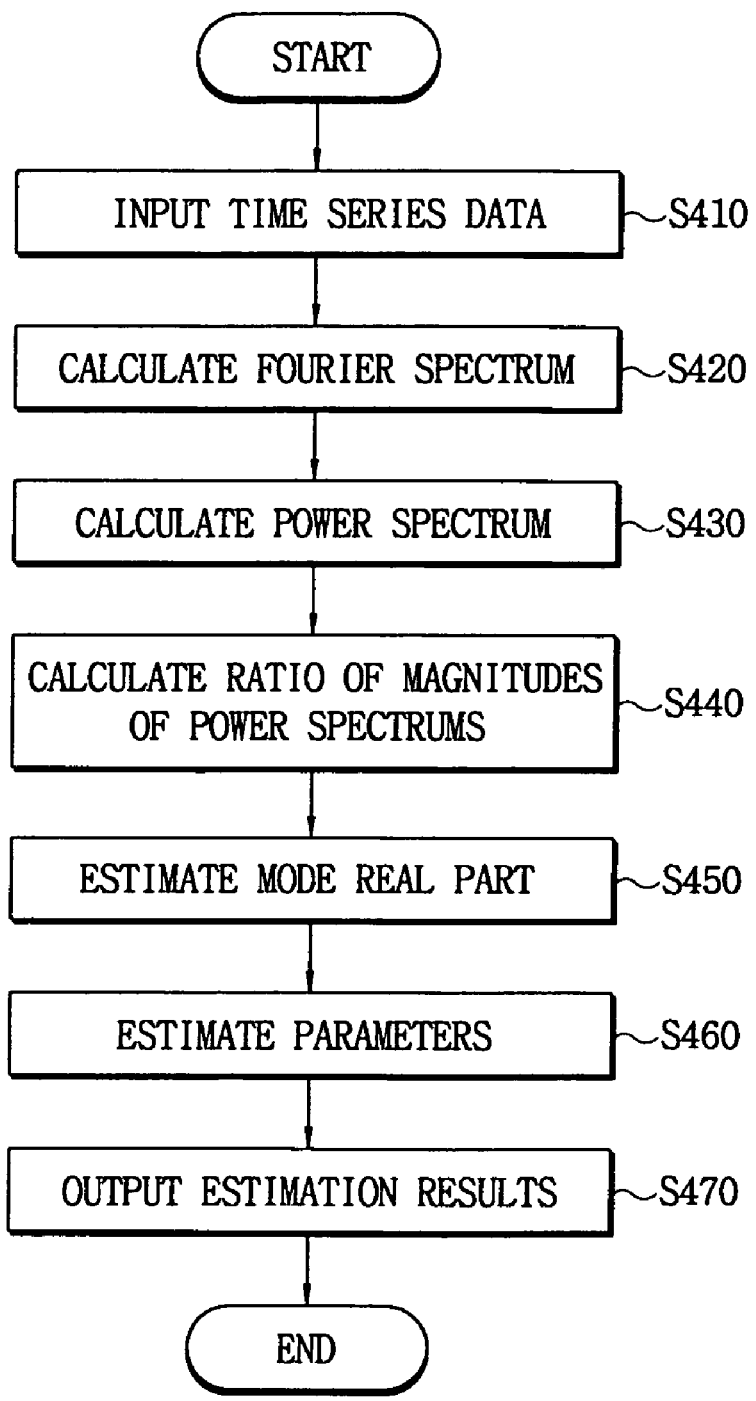
FIG. 16 is a flowchart showing an operating process in brief according to a fifth embodiment of the present invention.

The fifth embodiment of the present invention is a method of obtaining a mode on the basis of the ratio of power spectrums to estimate parameters by using the above-described principles, which is schematically depicted in FIG. 16.

That is, the fifth embodiment of the present invention includes the step S410 of inputting time series data to the calculation unit 20 through the input processing unit 10, the step S420 of the calculation unit 20 performing a Fourier spectrum with respect to the input time series data to calculate a Fourier spectrum, and the step S430 (refer to Equations [3] and [4]) of the calculation unit 20 calculating a power spectrum on the basis of the Fourier spectrum calculated at step S420.

Further, the fifth embodiment of the present invention includes the step S440 (Equation [13]) of the calculation unit 20 calculating the ratio of the magnitude of a power spectrum corresponding to a second arbitrary frequency within a preset range around the peak frequency of the power spectrum calculated at step S430 to the magnitude of a power spectrum corresponding to a first arbitrary frequency within the preset range around the peak frequency.

Further, the fifth embodiment of the present invention includes the step S450 (refer to Equation [17]) of the calculation unit 20 applying the ratio of the magnitudes of the power spectrums obtained at step S440 to both the power spectrum corresponding to the first arbitrary frequency and the power spectrum corresponding to the second arbitrary frequency, obtaining a quadratic equation (Equations [15] and [16]), obtaining the solution of the quadratic equation, and then obtaining the real part of a mode.

Further, the fifth embodiment of the present invention includes the step S460 (refer to Equations [20] to [23]) of the calculation unit 20 estimating the parameters of the time series data (for example, the real part and imaginary part of the mode, and the magnitude of a time series response) on the basis of the real part of the mode obtained at step S450, and the step S470 of outputting the results estimated by the calculation unit 20 through the output unit 30.

The above-described first to fifth embodiments of the present invention show the methods of obtaining modes and parameters.

However, according to the first to fifth embodiments of the present invention, the magnitude of the real part and the imaginary part (peak frequency) of the mode, which are the parameters of time series data, can be precisely estimated, but the sign "−" or "+" of the real part of the mode, which is an important factor, cannot be determined when the dynamic characteristics of the system are learned.

The reason for this is that most dynamic systems are assumed to be stably operated, that is, given (input) time series data are assumed to be stable, and so the sign is considered to be negative "−".

Therefore, the present invention additionally proposes a method of determining the stability/instability of a system on the basis of time series data (time response), which corresponds to sixth and seventh embodiments.

The sixth embodiment of the present invention is a method of comparing the sums of power spectrums over a plurality of time intervals with each other to determine whether a corresponding system is stable, and the seventh embodiment of the present invention is a method of comparing peak values of power spectrums over a plurality of time intervals with each other to determine whether a corresponding system is stable.

First, the principles applied to the sixth and seventh embodiments of the present invention are described.

In a time domain, the determination of stability-instability of a system depends on whether time domain data are converged or diverged. In the case of a simple function (for example, $x(t)=e^{-\alpha t}\sin \omega t$), the convergence or divergence of time domain data can be easily detected through a time response. However, since the time response of an actual system has various modes, it is difficult to determine the stability-instability of the system through the time response.

First, Parseval's theorem, indicating the relationship between a power spectrum and a time response, is defined in the following Equation [24].

$$\int_{-\infty}^{+\infty} |x(t)|^2 dt = \frac{1}{2\pi} \int_{-\infty}^{+\infty} |X(\omega)|^2 d\omega \quad [24]$$

Parseval's theorem means that total energy in a time domain is equal to total energy in a frequency domain, with respect to a continuous signal. Parseval's theorem is expressed as in the following Equation [25] in discrete data, wherein a left term indicates the mean energy of sampled signals during one period in a time domain, and a right term indicates the power spectrum calculated during one period in a frequency domain.

$$\frac{1}{N}\sum_{k=0}^{N-1} x[n]^2 = \sum_{k=0}^{N-1} \varphi[k] \quad [25]$$

The method of determining the stability-instability of a system according to sixth and seventh embodiments of the present invention is derived from Equation [25]. Therefore, with respect to time domain data having the same period, if mean energy decreases, it can be determined that a system is stable, while if the mean energy increases, it can be determined that the system is unstable.

In particular, as described above, when the frequency domain around a peak value in a Fourier spectrum is simulated as a time domain of an exponentially damped sine function, the stability-instability of a system can be determined using the sum of several power spectrums around the peak value (sixth embodiment), and the stability-instability of a system can be determined by comparing only peak values with each other when the peak values are high (seventh embodiment).

Figure 17:
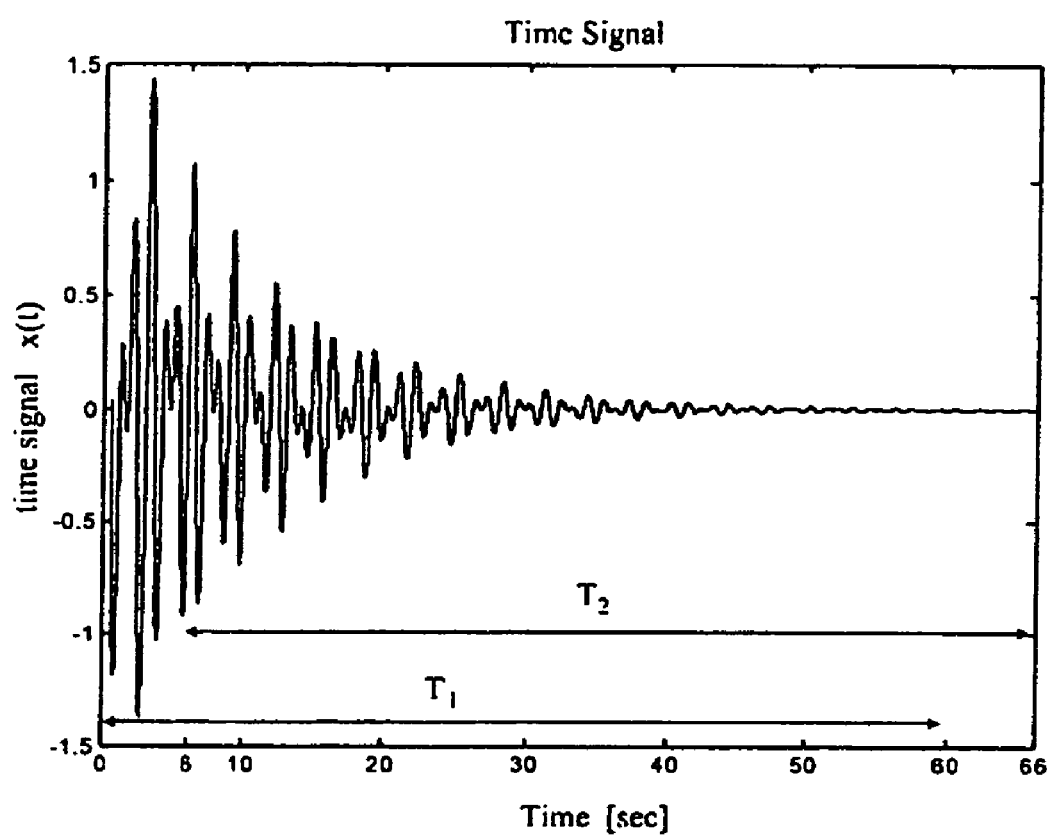
FIG. 17 is a waveform diagram of a power spectrum in which a time response is continuously damped.

With respect to a time response $x(t)=e^{-0.1t}\sin 2\pi t$ as shown in FIG. 17, a Fourier transform is performed over time intervals $T_1$ and $T_2$ ($T_2$ is delayed from $T_1$ by a preset time difference, and time widths of $T_1$ and $T_2$ are the same) to calculate power spectrums. In this case, if the peak values of the power spectrums at the same frequency (1 Hz in FIG. 18) are $\zeta_1(\omega_1)\cdot\zeta_2(\omega_1)$, respectively, the power spectrums satisfy the relationship of the following Equation [26] when the system is stable, that is, when the time response is continuously damped, as shown in FIG. 17.

$$\zeta_1(\omega_1)>\zeta_2(\omega_1) \quad [26]$$

Further, if the sum of k power spectrums around the peak frequency in the time interval is $T_1$ is $\Sigma\zeta_1[\pm k]$, and the sum of k power spectrums in the time interval $T_2$ is $\Sigma\zeta_2[\pm k]$, the relationship of the following Equation [27] is satisfied. For example, in typical cases, a sufficiently exact value is obtained if k is about 2 to 5, and the continuous left and right power spectrum values must always decrease from the peak value. That is, if a frequency is lower than the peak frequency (left), $\zeta[z''+1]>\zeta[z'']$ must be satisfied, and if a frequency is higher than the peak frequency (right), $\zeta[z''+1]<\zeta[z'']$ must be satisfied.

$$\Sigma\zeta_1[\pm k]>>\Sigma\zeta_2[\pm k] \quad [27]$$

Figure 18:
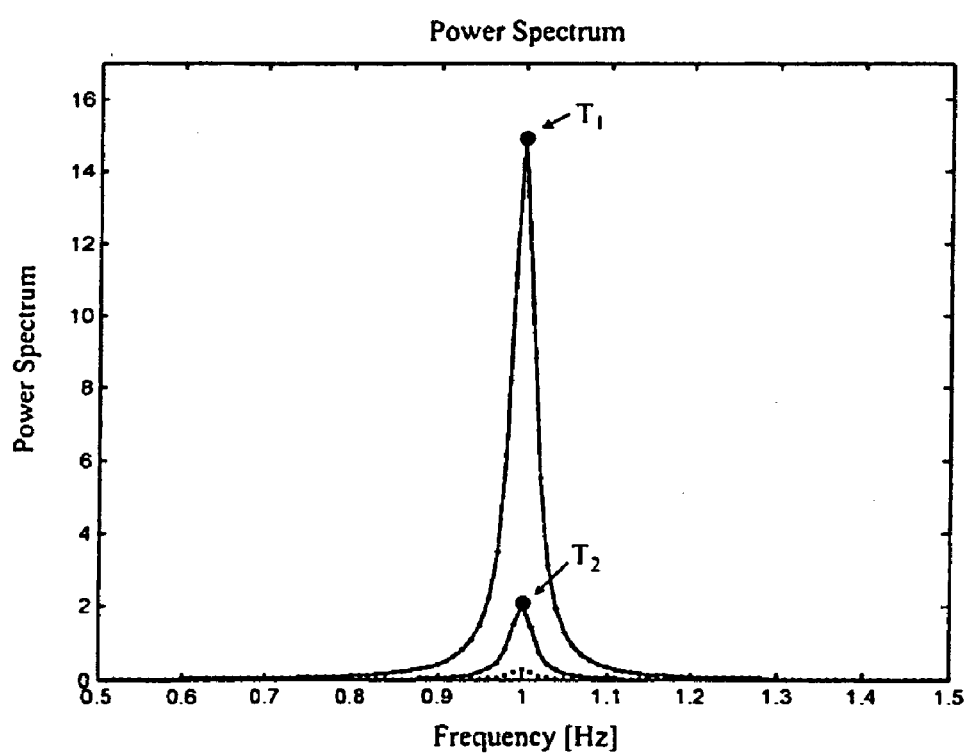
FIG. 18 is a waveform diagram showing the comparison of peak values in a plurality of time intervals obtained on the basis of the power spectrum of FIG. 17.

In FIG. 18, since the peak value $\zeta_1(\omega_1)$ of the power spectrum corresponding to the time interval $T_1$ is higher than the peak value $\zeta_2(\omega_1)$ of the power spectrum corresponding to the time interval $T_2$, Equation [26] is satisfied, and Equation [27], indicating the sums of power spectrums, is also satisfied. Therefore, it can be determined that a given system is stable.

Figure 19:
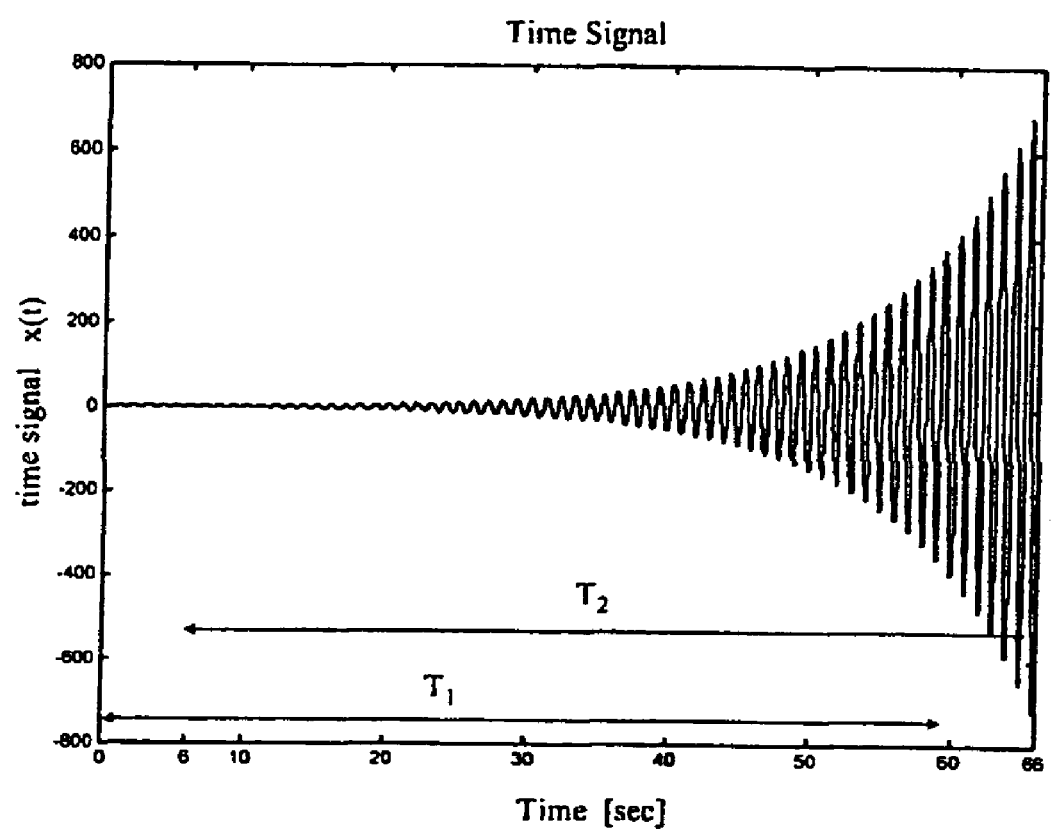
FIG. 19 is a waveform diagram of a power spectrum in which a time response is continuously increased.

Next, a time response $x(t)=e^{-0.1t}\sin 2\pi t$ shown in FIG. 19 is considered. This corresponds to the case where a time response continuously diverges. At this time, power spectrums have the relationship of the following Equation [28]. A peak value $\zeta_1(\omega_1)$ is the peak value of a power spectrum over a time interval $T_1$, and a peak value $\zeta_2(\omega_1)$ is the peak value of a power spectrum over a time interval $T_2$. Further, the sums of the power spectrums around a peak frequency satisfy the relationship of the following Equation [29].

$$\zeta_1(\omega_1)<\zeta_2(\omega_1) \quad [28]$$

$$\Sigma\zeta_1[\pm k]<<\Sigma\zeta_2[\pm k] \quad [29]$$

Figure 20:
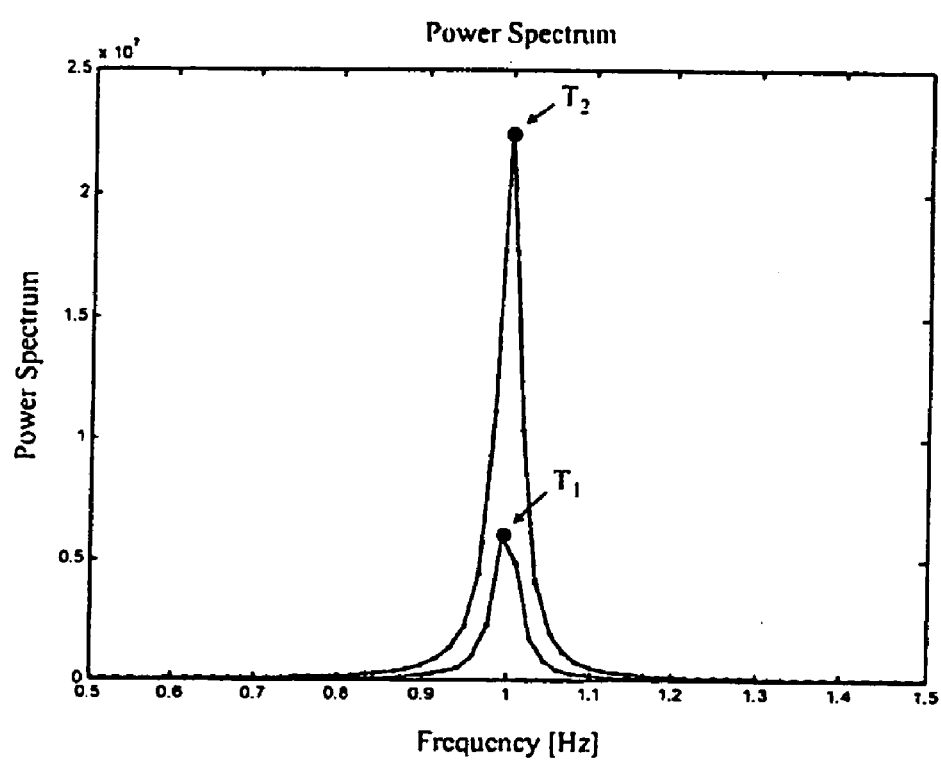
FIG. 20 is a waveform diagram showing the comparison of peak values in a plurality of time intervals obtained on the basis of the power spectrum of FIG. 19.

In FIG. 20, since the peak values $\zeta_1(\omega_1)$ and $\zeta_2(\omega_1)$ of the power spectrums corresponding to the time intervals $T_1$ and $T_2$ satisfy Equation [28], and Equation [29] indicating the sums of power spectrums is satisfied, it can be determined that a given system is unstable.

Figure 21:
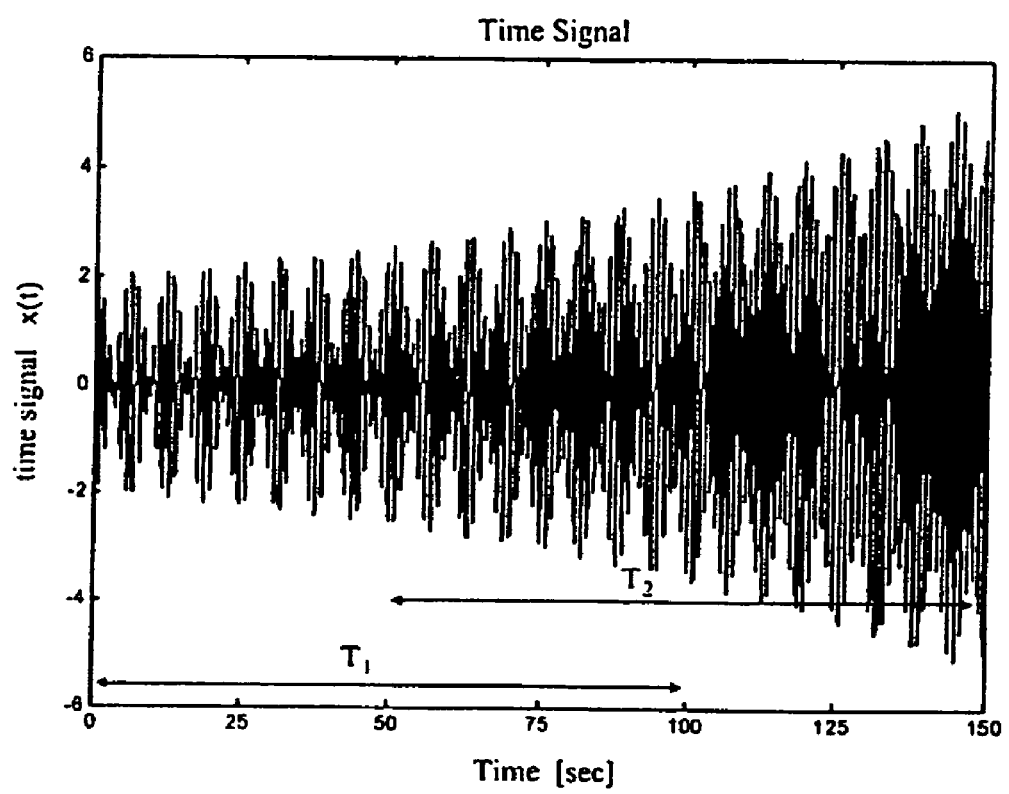
FIG. 21 is a waveform diagram of a power spectrum showing the time response of time series data having a stable mode and an unstable mode.
Figure 22:
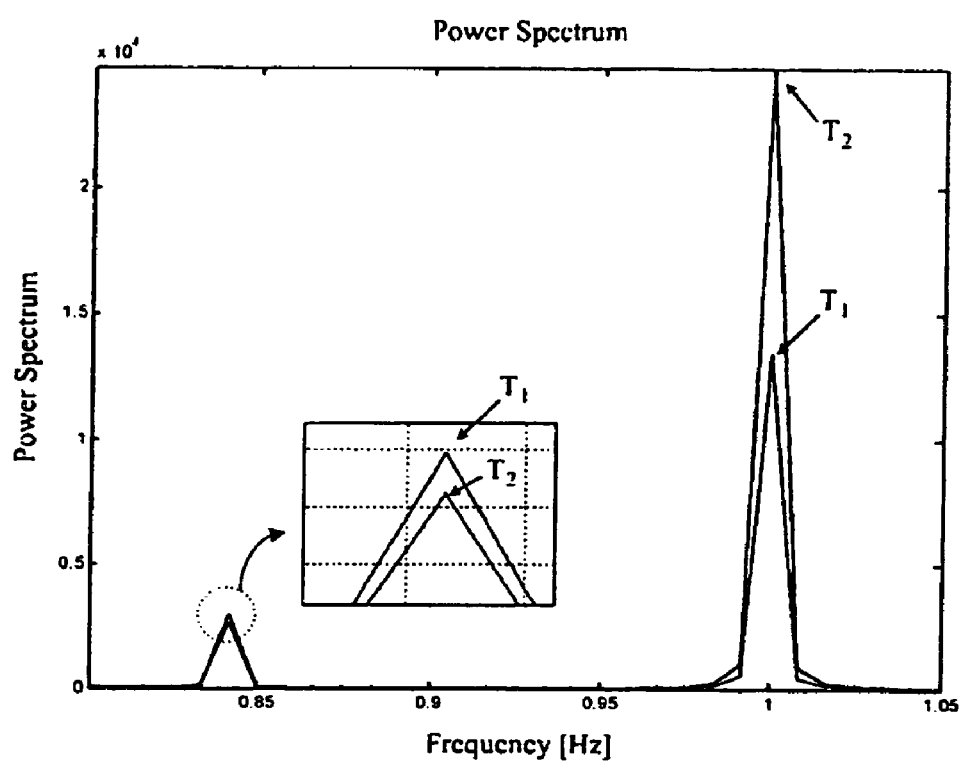
FIG. 22 is a waveform diagram showing the comparison of peak values in a plurality of time intervals obtained on the basis of the power spectrum of FIG. 21.

FIG. 21 shows the time response of a function, which is expressed in the following Equation [30] and in which a stable mode and an unstable mode exist, and FIG. 22 shows the power spectrum of the time response.

$$x(t)=e^{-0.01t}\sin 4.1t + e^{0.001t}\sin 6.28t \qquad [30]$$

In FIG. 22, since a frequency of 0.84 Hz corresponds to a negative (−) mode, Equations [26] and [27] are satisfied. Since a frequency of 1 Hz corresponds to a positive (+) mode, Equations [28] and [29] are satisfied.

Therefore, if a fast Fourier transform is performed twice and the magnitudes of power spectrums are compared to each other, the stability-instability of a time response can be determined.

The above-described technical principles are applied to the sixth and seventh embodiments of the present invention, which are described below.

Sixth Embodiment

Figure 23:
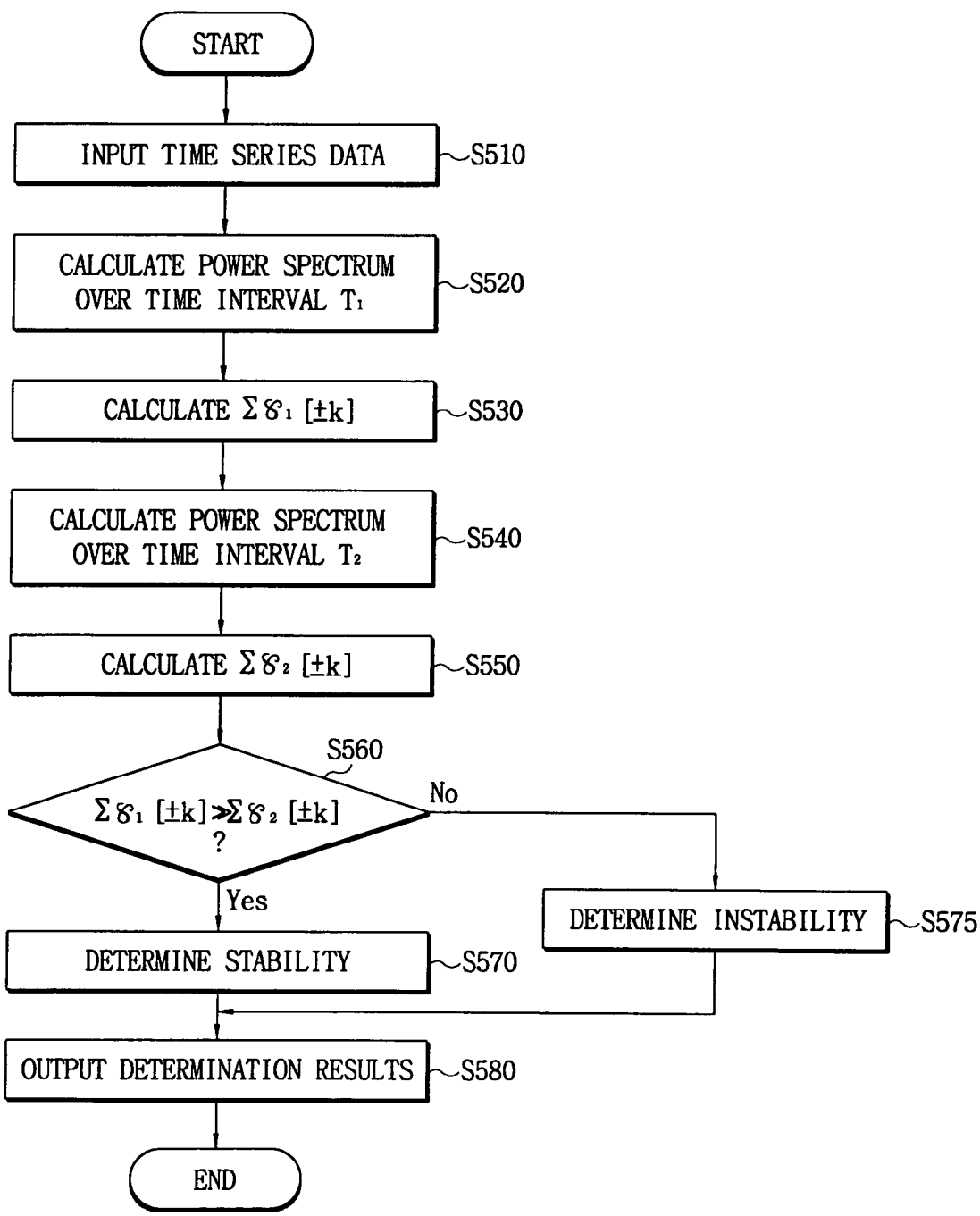
FIG. 23 is a flowchart showing an operating process in brief according to a sixth embodiment of the present invention.

First, the sixth embodiment of the present invention is a method of comparing the sums of power spectrums over a plurality of time intervals $T_1$ and $T_2$ with each other using the above-described principles to determine whether a given system is stable, which is schematically depicted in FIG. 23.

That is, the sixth embodiment of the present invention includes the step S510 of inputting time series data to the calculation unit 20 through the input processing unit 10, the step S520 of the calculation unit 20 performing a Fourier transform with respect to the input time series data to calculate a power spectrum over a time interval $T_1$, and the step S530 of the calculation unit 20 calculating the sum of k power spectrums $\Sigma\zeta_1[\pm k]$ over the time interval $T_1$.

Further, the sixth embodiment of the present invention includes the step S540 of the calculation unit 20 calculating a power spectrum over a time interval $T_2$ delayed from the time interval $T_1$ by a preset time, and the step S550 of the calculation unit 20 calculating the sum of k power spectrums $\Sigma\zeta_2[\pm k]$ over the time interval $T_2$. However, the widths (the number of pieces of time domain data) of the time interval $T_1$ and the time interval $T_2$ are the same.

Further, the sixth embodiment of the present invention includes the step S560 of the calculation unit 20 comparing the sum of k power spectrums $\Sigma\zeta_1[\pm k]$ over the time interval $T_1$ with the sum of k power spectrums $\Sigma\zeta_2[\pm k]$ over the time interval $T_2$, the step S570 of the calculation unit 20 determining that a system is stable if the sum of k power spectrums over the time interval $T_1$ is higher than the sum of k power spectrums over the time interval $T_2$ at step S560, the step S575 of the calculation unit 20 determining that the system is unstable if the sum of k power spectrums over the time interval $T_1$ is equal to or lower than the sum of k power spectrums over the time interval $T_2$ at step S560, and the step S580 of outputting the results determined by the calculation unit 20 through the output unit 30.

Seventh Embodiment

Figure 24:
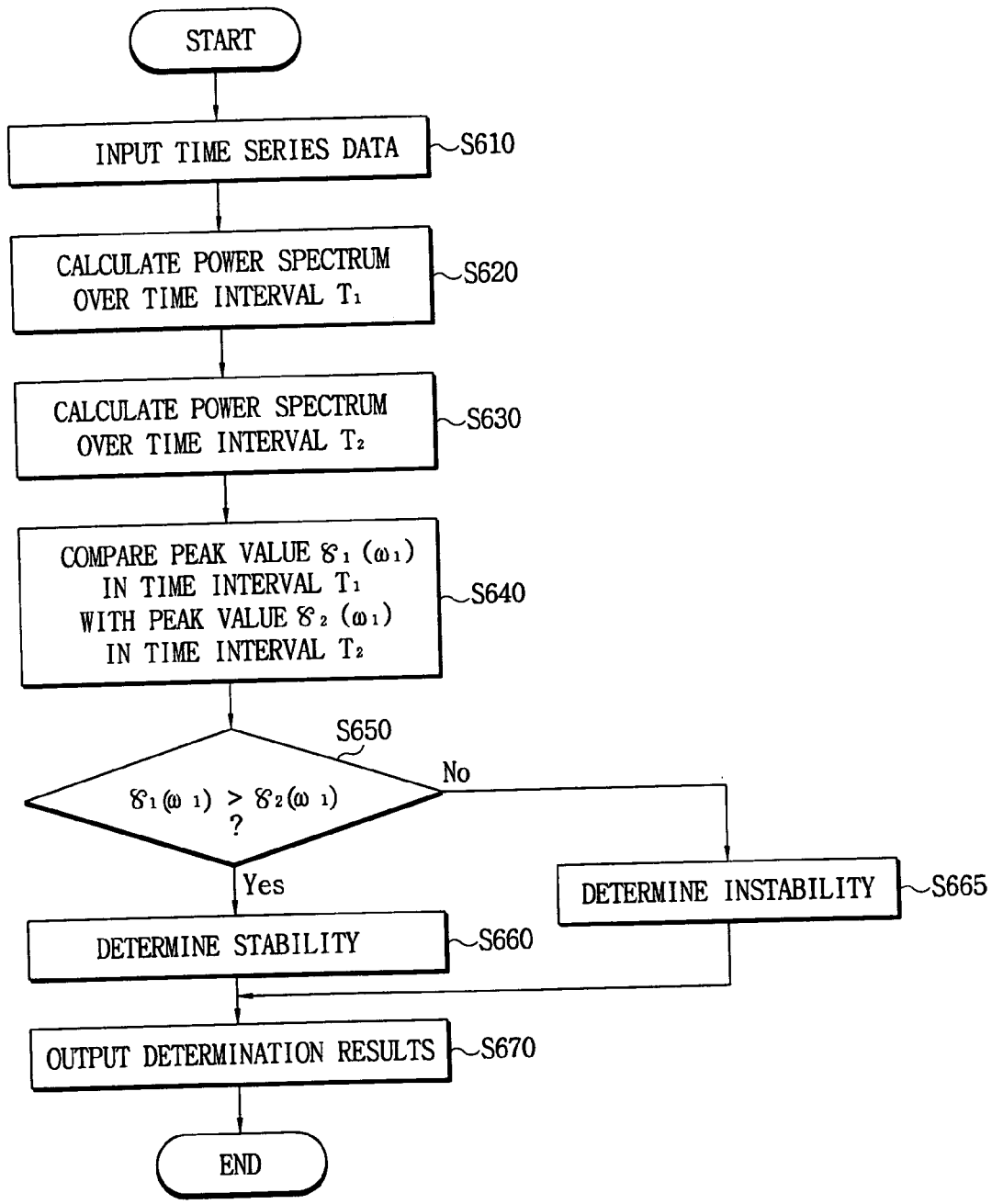
FIG. 24 is a flowchart showing an operating process in brief according to a seventh embodiment of the present invention.

The seventh embodiment of the present invention is a method of comparing the peak values of power spectrums over a plurality of time intervals $T_1$ and $T_2$ with each other to determine whether a given system is stable using the above-described principles, which is schematically depicted in FIG. 24.

That is, the seventh embodiment of the present invention includes the step S610 of inputting time series data to the calculation unit 20 through the input processing unit 10, the step S620 of the calculation unit 20 performing a Fourier transform with respect to the input time series data to calculate a power spectrum over a time interval $T_1$, and the step S630 of the calculation unit 20 calculating a power spectrum over a time interval $T_2$ delayed from the time interval $T_1$ by a preset time.

Further, the seventh embodiment of the present invention includes the steps S640 and S650 of the calculation unit 20 comparing a peak value $\zeta_1(\omega_1)$ in the time interval $T_1$ with a peak value $\zeta_2(\omega_1)$ in the time interval $T_2$ to determine which one is higher, the step S660 of the calculation unit 20 determining that the system is stable if the peak value in the time interval $T_1$ is higher than the peak value in the time interval $T_2$ at step S650, the step S665 of the calculation unit 20 determining that the system is unstable if the peak value in the time interval $T_1$ is equal to or lower than the peak value in the time interval $T_2$ at step S650, and the step S670 of outputting the results determined by the calculation unit 20 through the output unit 30.

As described above, the sixth and seventh embodiments are adapted to additionally determine the stability/instability of an object system to which real-time data having estimated parameters are to be inputted, and can be added and applied to the above-described first to fifth embodiments, if necessary.

Further, when the stability/instability of a system is intended to be determined, any one or both of the sixth and seventh embodiments may be used, or the sixth or seventh embodiment may be selected and applied according to time series data. For example, if the peak value of a power spectrum of the time series data is higher than a preset value, the seventh embodiment may be selected and applied, while if the peak value thereof is equal to or lower than a preset value, the sixth embodiment can be selected and applied.

As described above, the present invention provides a method of estimating the parameter of time series data using a Fourier transform, which can directly estimate modes and parameters indicating the characteristics of a dynamic system on the basis of the Fourier transform of time series data, and does not depend on simulation unlike conventional methods, thus estimating the parameters of a system through a single Fourier transform without repeatedly calculating a Fourier transform.

That is, the present invention is advantageous in that, since the present invention can shorten the time required to estimate parameters and obtain modes in real time, it can improve the performance of a system requiring the rapid estimation of parameters. In particular, since the present invention is related to a simple and definitive algorithm based on mathematical equations, it can be easily applied to all systems using a Fourier transform.

Further, the present invention is advantageous in that it can determine the stability of time domain data through a power spectrum, thus stably operating a system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A machine-implemented method of estimating parameters of time series data using a Fourier transform, comprising the steps of:

performing an Analog-to-Digital (A/D) conversion with respect to analog signal type time series data and inputting a result thereof;

performing a Fourier transform with respect to the inputted time series data to calculate a peak Fourier spectrum $X(\omega_1)$ of a peak frequency $\omega_1$;

obtaining a real part $\alpha$ of a mode by applying a frequency $\omega_\alpha$ of the Fourier spectrum corresponding to $1/\sqrt{2}$ of a magnitude of the calculated peak Fourier spectrum $X(\omega_1)$ and the peak frequency $\omega_1$ into an equation $\alpha = |\omega_1 - \omega_\alpha|$;

obtaining a magnitude A of the time series data by applying the obtained peak Fourier spectrum $X(\omega_1)$, the peak frequency $\omega_1$, and the real part $\alpha$ of the mode into an equation $$A = \frac{\alpha\sqrt{\alpha^2 + A\omega_1^2}}{\omega_1} X(\omega_1);$$

and outputting the magnitude A of the time series data, the real part $\alpha$ of the mode, and the peak frequency $\omega_1$, which are respective parameters obtained above.

2. The parameter estimation method according to claim 1, further comprising the step of determining whether an object system to which the time series data are to be inputted is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing a sum $\Sigma\zeta_1[\pm k]$ of k number of the power spectrum around the calculated peak value $\zeta_1(\omega_1)$ of the first time interval $T_1$ with a sum $\Sigma\zeta_2[\pm k]$ of k number of the power spectrum around the peak value $\zeta_2(\omega_1)$ of the second time interval $T_2$, determining that the system is stable if the sum of $\Sigma\zeta_1[\pm k]$ of the power spectrum in the first time interval $T_1$ is greater than the sum of the power spectrum in the second time interval $T_2$ as a result of the comparison ($\Sigma\zeta_1[\pm k] >> \Sigma\zeta_2[\pm k]$), and outputting the determination result via digital data.

3. The parameter estimation method according to claim 1, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing the calculated peak value $\zeta_1(\omega_1)$ of the first time interval $T_1$ with the peak value $\zeta_2(\omega_1)$ of the second time interval $T_2$, determining that the system is stable if the peak value $\zeta_1(\omega_1)$ of the first time interval $T_1$ is greater than the peak value of the second time interval as a result of the comparison ($\zeta_1(\omega_1) > \zeta_2(\omega_1)$), and outputting the determination result via digital data.

4. A machine-implemented method of estimating parameters of time series data using a Fourier transform, comprising the steps of:

performing an Analog-to-Digital (A/D) conversion with respect to analog time series data and inputting a result thereof;

performing a Fourier transform with respect to the inputted time series data to calculate a peak Fourier spectrum $X(\omega_1)$ of a peak frequency $\omega_1$, and calculating a peak power spectrum $\zeta_1(\omega_1)$ on the basis of the peak Fourier spectrum;

obtaining a real part $\alpha$ of a mode by applying a frequency $\omega_\alpha$ of the power spectrum corresponding to ½ of a magnitude of the calculated peak power spectrum $\zeta_1(\omega_1)$ and the peak frequency $\omega_1$ into an equation $\alpha = |\omega_1 - \omega_\alpha|$;

obtaining a magnitude A of the time series data by applying the obtained peak power spectrum $\zeta_1(\omega_1)$, the peak frequency $\omega_1$, and the real part $\alpha$ of the mode into an equation $$\wp(\omega_1) = \frac{(A\omega_1)^2}{\alpha^4 + (2\alpha\omega_1)^2};$$

and outputting the magnitude A of the time series data, the real part $\alpha$ of the mode, and the peak frequency $\omega_1$, which are respective parameters obtained above.

5. The parameter estimation method according to claim 4, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing a sum $\Sigma\zeta_1[\pm k]$ of k number of the power spectrum around the calculated peak value $\zeta_1(\omega_1)$ of the first time interval $T_1$ with a sum $\Sigma\zeta_2[\pm k]$ of k number of the power spectrum around the peak value $\zeta_2(\omega_1)$ of the second time interval $T_2$, determining that the system is stable if the sum of $\Sigma\zeta_1[\pm k]$ of the power spectrum in the first time interval $T_1$ is greater than the sum of the power spectrum in the second time interval $T_2$ as a result of the comparison ($\Sigma\zeta_1[\pm k] >> \Sigma\zeta_2[\pm k]$), and outputting the determination result via digital data.

6. The parameter estimation method according to claim 4, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing the calculated peak value $\zeta_1(\omega_1)$ of the first time interval $T_1$ with the peak value $\zeta_2(\omega_1)$ of the second time interval $T_2$, determining that the system is stable if the peak value $\zeta_1(\omega_1)$ of the first time interval $T_1$ is greater than the peak value of the second time interval as a result of the comparison ($\zeta_1(\omega_1) > \zeta_2(\omega_1)$), and outputting the determination result via digital data.

7. A machine-implemented method of estimating parameters of time series data using a Fourier transform, comprising the steps of:

performing an Analog-to-Digital (A/D) conversion with respect to analog time series data and inputting a result thereof;

performing a Fourier transform with respect to the inputted time series data to calculate a peak Fourier spectrum $X(\omega_1)$ of a peak frequency $\omega_1$;

obtaining a real part $\alpha$ of a mode by applying a frequency $\omega_\alpha$ of the Fourier spectrum corresponding to $1/\sqrt{2}$ of a magnitude of the calculated peak Fourier spectrum $X(\omega_1)$ and the peak frequency $\omega_1$ into an equation $\alpha = |\omega_1 - \omega_\alpha|$;

calculating a peak power spectrum $\zeta_1(\omega_1)$ on the basis of the peak Fourier spectrum $X(\omega_1)$;

obtaining a real part $\alpha$ of a mode by applying a frequency $\omega_\alpha$ of the power spectrum corresponding to $\frac{1}{2}$ of a magnitude of the calculated peak power spectrum $\zeta_1(\omega_1)$ and the peak frequency $\omega_1$ into an equation $\alpha = |\omega_1 - \omega_\alpha|$;

selecting the lowest value between the real part $\alpha$ of the first mode and the real part $\alpha$ of the second mode, and selecting a spectrum relating to the mode having the selected lowest value between the calculated peak Fourier spectrum $X(\omega_1)$ and the peak power spectrum $\zeta_1(\omega_1)$;

calculating a magnitude A of the time series data by applying the real part $\alpha$ of the selected mode, the selected spectrum, and the peak frequency $\omega_1$ into an equation $$A = \frac{\alpha\sqrt{\alpha^2 + A\omega_1^2}}{\omega_1} X(\omega_1)$$

or an equation $$\wp(\omega_1) = \frac{(A\omega_1)^2}{\alpha^4 + (2\alpha\omega_1)^2};$$

and outputting the magnitude A of the time series data, the real part $\alpha$ of the mode, and the peak frequency $\omega_1$, which are respective parameters obtained above.

8. The parameter estimation method according to claim 7, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing a sum $\Sigma\zeta_1[\pm k]$ of k number of the power spectrum around the calculated peak value $\zeta_1(\omega_1)$ of the first time interval $T_1$ with a sum $\Sigma\zeta_2[\pm k]$ of k number of the power spectrum around the peak value $\zeta_2(\omega_1)$ of the second time interval $T_2$, determining that the system is stable if the sum of $\Sigma\zeta_1[\pm k]$ of the power spectrum in the first time interval $T_1$ is greater than the sum of the power spectrum in the second time interval $T_2$ as a result of the comparison ($\Sigma\zeta_1[\pm k] >> \Sigma\zeta_2[\pm k]$), and outputting the determination result via digital data.

9. The parameter estimation method according to claim 7, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing the calculated peak value $\zeta_1(\omega_1)$ of the first time interval $T_1$ with the peak value $\zeta_2(\omega_1)$ of the second time interval $T_2$, determining that the system is stable if the peak value $\zeta_1(\omega_1)$ of the first time interval $T_1$ is greater than the peak value of the second time interval as a result of the comparison ($\zeta_1(\omega_1) > \zeta_2(\omega_1)$), and outputting the determination result via digital data.

10. A machine-implemented method of estimating parameters of time series data using a Fourier transform, comprising the steps of:

performing an Analog-to-Digital (A/D) conversion with respect to analog time series data and inputting a result thereof;

performing a Fourier transform with respect to the inputted time series data to calculate a peak Fourier spectrum $X(\omega_1)$ of a peak frequency $\omega_1$;

obtaining a ratio $r_s$ of a magnitude of the peak Fourier spectrum $X(\omega_1)$ and a magnitude of a Fourier spectrum $X(\omega_2)$ corresponding to an arbitrary frequency $\omega_2$ close to the peak frequency $\omega_1$ using an equation $$r_s = \frac{X(\omega_2)}{X(\omega_1)} \; (r_s < 1);$$

obtaining coefficients $a=r_s^2-1$, $b=2r_s^2(\omega_1^2-\omega_2^2)-4\omega_1^2$, $c=r_s^2(\omega_1^2-\omega_2^2)^2$ of a quadratic equation $ax^2+bx+c=0$ using the obtained ratio $r_s$ of the magnitude of the Fourier spectrum, and calculating a real part $\alpha$ of a mode by applying a solution x obtained from the quadratic equation into a relationship $\alpha=\sqrt{x}$;

obtaining a magnitude A of the time series data by applying the obtained peak Fourier spectrum $X(\omega_1)$, the peak frequency $\omega_1$, and the real part $\alpha$ of the mode into an equation $$A = \frac{\alpha\sqrt{\alpha^2 + A\omega_1^2}}{\omega_1} X(\omega_1);$$

and outputting the magnitude A of the time series data, the real part $\alpha$ of the mode, and the peak frequency $\omega_1$, which are respective parameters obtained above.

11. The parameter estimation method according to claim 10, further comprising the step of determining whether an object system of the time series data is stable, wherein the determining step comprises the steps of:
performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing a sum $\Sigma\zeta_1[\pm k]$ of k number of the power spectrum around the calculated peak value $\zeta_1(\omega_1)$ of the first time interval $T_1$ with a sum $\Sigma\zeta_1[\pm k]$ of k number of the power spectrum around the peak value $\zeta_2(\omega_1)$ of the second time interval $T_2$, determining that the system is stable if the sum of $\Sigma\zeta_1[\pm k]$ of the power spectrum in the first time interval $T_1$ is greater than the sum of the power spectrum in the second time interval $T_2$ as a result of the comparison ($\Sigma\zeta_1[\pm k]>>\Sigma\zeta_2[\pm k]$), and outputting the determination result via digital data.

12. The parameter estimation method according to claim 10, further comprising the step of determining whether an object system of the time series data is stable, wherein the determining step comprises the steps of:
performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing the calculated peak value $\zeta_1(\omega_1)$, of the first time interval $T_1$ with the peak value $\zeta_2(\omega_1)$ of the second time interval $T_2$, determining that the system is stable if the peak value $\zeta_1(\omega_1)$ of the first time interval $T_1$ is greater than the peak value of the second time interval as a result of the comparison ($\zeta_1(\omega_1)>\zeta_2(\omega_1)$), and outputting the determination result via digital data.

13. A machine-implemented method of estimating parameters of time series data using a Fourier transform, comprising the steps of:

performing an Analog-to-Digital (A/D) conversion with respect to analog time series data and inputting a result thereof;

performing a Fourier transform with respect to the inputted time series data to calculate a peak Fourier spectrum $X(\omega_1)$ of a peak frequency $\omega_1$;

calculating a peak power spectrum $\zeta(\omega_1)$ on the basis of the peak Fourier spectrum $X(\omega_1)$;

obtaining a ratio $r_p$ of a magnitude of the peak $\zeta(\omega_1)$ and a magnitude of a power spectrum $\zeta(\omega_2)$ corresponding to an arbitrary frequency $\omega_2$ close to the peak frequency $\omega_1$ using an equation $$r_s = \frac{X(\omega_2)}{X(\omega_1)} \; (r_s < 1);$$

obtaining coefficients $a=r_p^2-1$, $b=2r_p^2(\omega_1^2-\omega_2^2)-4\omega_1^2$, $c=r_p^2(\omega_1^2-\omega_2^2)^2$ of a quadratic equation $ax^2+bx+c=0$ using the obtained ratio $r_s$ of the magnitude of the Fourier spectrum, and calculating a real part $\alpha$ of a mode by applying a solution x obtained from the quadratic equation into a relationship $\alpha=\sqrt{x}$;

obtaining a magnitude A of the time series data by applying the obtained peak Fourier spectrum $X(\omega_1)$, the peak frequency $\omega_1$, and the real part $\alpha$ of the mode into an equation $$\wp(\omega_1) = \frac{(A\omega_1)^2}{\alpha^4 + (2\alpha\omega_1)^2};$$

and outputting the magnitude A of the time series data, the real part $\alpha$ of the mode, and the peak frequency $\omega_1$, which are respective parameters obtained above.

14. The parameter estimation method according to claim 13, further comprising the step of determining whether an object system of the time series data is stable, wherein the determining step comprises the steps of:
performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing a sum $\Sigma\zeta_1[\pm k]$ of k number of the power spectrum around the calculated peak value $\zeta_1(\omega_1)$ of the first time interval $T_1$ with a sum $\Sigma\zeta_2[\pm k]$ of k number of the power spectrum around the peak value $\zeta_1(\omega_1)$ of the second time interval $T_2$, determining that the system is stable if the sum of $\Sigma\zeta_1[\pm k]$ of the power spectrum in the first time interval $T_1$ is greater than the sum of the power spectrum in the second time interval $T_2$ as a result of the comparison ($\Sigma\zeta_1[\pm k] >> \Sigma\zeta_2[\pm k]$), and outputting the determination result via digital data.

15. The parameter estimation method according to claim 13, further comprising the step of determining whether an object system of the time series data is stable, wherein the determining step comprises the steps of:

performing an Analog-to-Digital (A/D) conversion with respect to analog time series data and inputting a result thereof, performing a Fourier transform with respect to the inputted time series data in a first time interval $T_1$ of a peak frequency $\omega_1$ and a second time interval $T_2$ delayed from the first time interval by a predetermined period of time, respectively, to calculate peak values $\zeta_1(\omega_1)$, $\zeta_2(\omega_1)$ of the power spectrum of the respective time interval, comparing the calculated peak value $\zeta_1(\omega_1)$ of the first time interval $T_1$ with the peak value $\zeta_2(\omega_1)$ of the second time interval $T_2$, determining that the system is stable if the peak value $\zeta_1(\omega_1)$ of the first time interval $T_1$ is greater than the peak value of the second time interval as a result of the comparison ($\zeta_1(\omega_1) > \zeta_2(\omega_1)$), and outputting the determination result via digital data.

* * * * *